United States Patent
Fujitsuka et al.

(10) Patent No.: US 6,801,192 B2
(45) Date of Patent: Oct. 5, 2004

(54) PEN-SHAPED COORDINATE POINTING DEVICE

(75) Inventors: Hiroyuki Fujitsuka, Saitama-ken (JP); Yashuyuki Fukushima, Ibaraki-ken (JP)

(73) Assignee: Wacom Company Ltd., Saitama-ken (JP)

(*) Notice: Subject to any disclaimer, the term of this patent is extended or adjusted under 35 U.S.C. 154(b) by 270 days.

(21) Appl. No.: 09/956,985

(22) Filed: Sep. 21, 2001

(65) Prior Publication Data

US 2002/0070927 A1 Jun. 13, 2002

(30) Foreign Application Priority Data

Dec. 13, 2000 (JP) ........................................ 2000-379439

(51) Int. Cl.[7] .......................... G09G 5/00; G06K 11/06; G06K 11/16; G06K 11/18
(52) U.S. Cl. ................ 345/179; 178/18.01; 178/18.07; 178/19.01; 178/19.03; 178/19.04
(58) Field of Search ................................ 345/179, 156; 178/18.01–18.07, 19.01–19.07

(56) References Cited

U.S. PATENT DOCUMENTS

| | | | |
|---|---|---|---|
| 4,786,896 A | * 11/1988 | Harte | .......................... 345/173 |
| 4,988,837 A | * 1/1991 | Murakami et al. | ........ 178/18.07 |
| 5,134,689 A | 7/1992 | Murakami et al. | |
| 5,206,785 A | 4/1993 | Hukashima | |
| 5,461,204 A | * 10/1995 | Makinwa et al. | ......... 178/19.03 |
| 5,565,632 A | 10/1996 | Ogawa | |
| 5,633,471 A | 5/1997 | Fukushima | |
| 5,717,435 A | * 2/1998 | Fukushima et al. | .......... 345/179 |
| 5,854,881 A | * 12/1998 | Yoshida et al. | .............. 345/104 |
| 5,914,708 A | * 6/1999 | LaGrange et al. | ........... 345/179 |
| 5,963,199 A | * 10/1999 | Kato et al. | .................... 345/179 |
| 5,977,959 A | * 11/1999 | Katsurahira et al. | ......... 345/179 |

* cited by examiner

Primary Examiner—Bipin Shalwala
Assistant Examiner—David L. Lewis
(74) Attorney, Agent, or Firm—Liniak, Berenato & White, LLC

(57) ABSTRACT

In an input pen having a pen-shaped casing, a ferrite core with a coil wound thereon and a ferrite chip are placed opposed to each other via an O-ring. The ferrite chip has a projection. When the input pen is operated, the projection and the ferrite core are moved closer together. When the ferrite chip is moved closer to the ferrite core during operation, the projection is placed substantially close to the ferrite core. Therefore, high responsivity is ensured without moving the ferrite chip into the coil, and there is no need to form an opening or a cavity in the ferrite core.

7 Claims, 13 Drawing Sheets

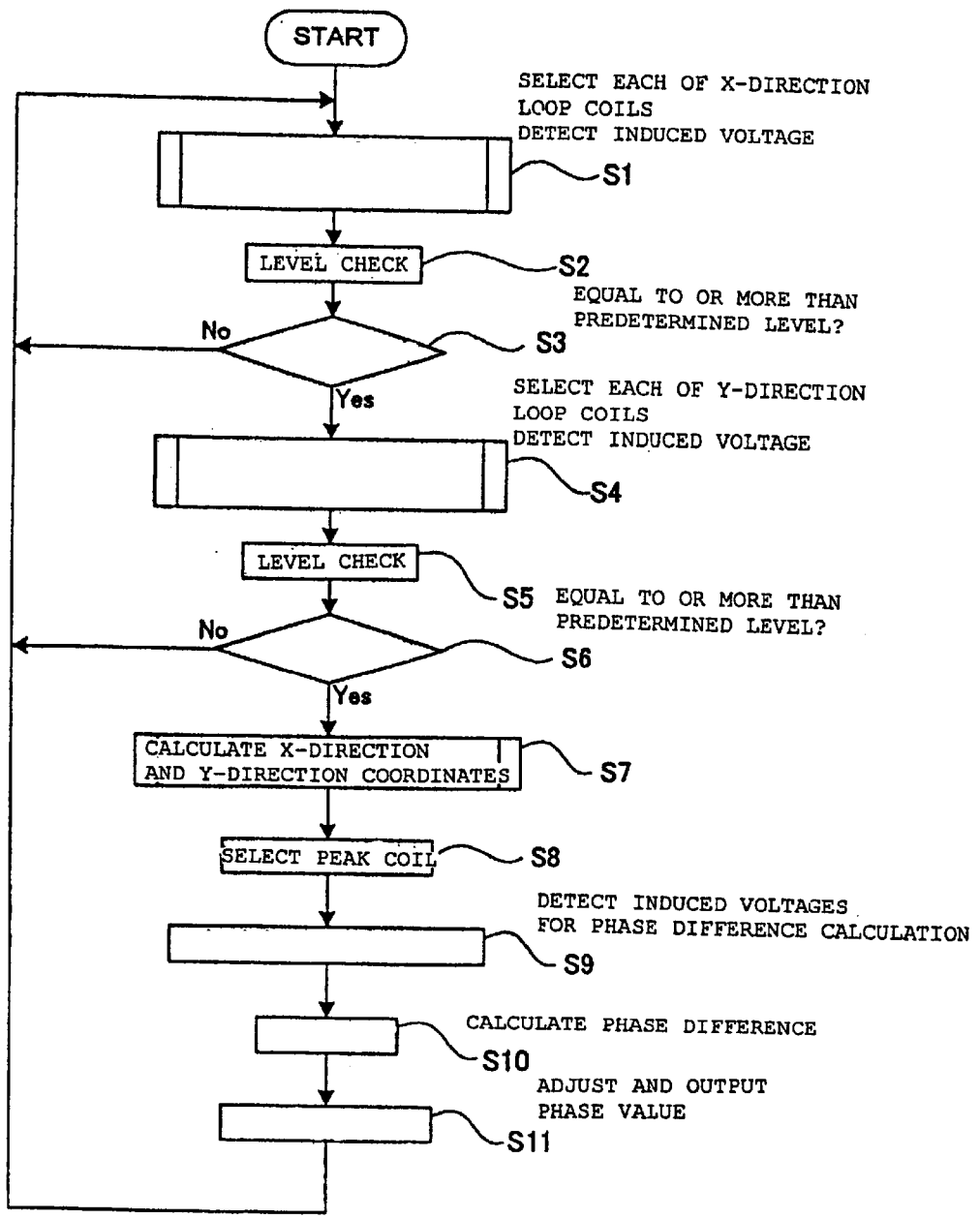

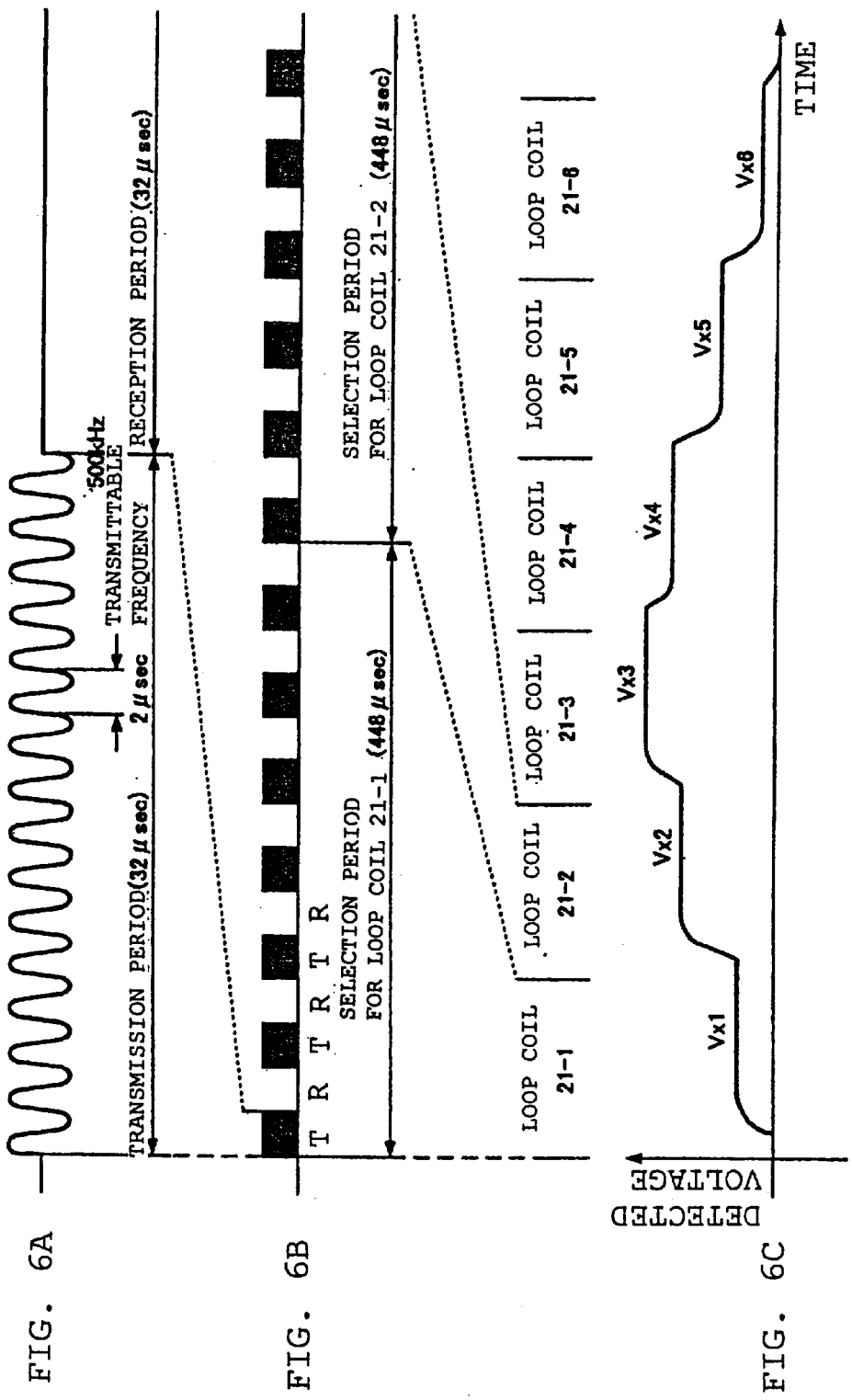

PEN-SHAPED COORDINATE POINTING DEVICE

BACKGROUND OF THE INVENTION

1. Field of the Invention

The present invention relates to a pen-shaped coordinate pointing device which indicates a position to be determined and an operation by an operator to a position detecting device, such as a tablet, for determining the position.

2. Description of the Related Art

Conventionally, a pointing device, called a "pen and tablet", may be used as one of the input devices for computers. The pen and tablet is a combination of a platelike tablet and an input pen to be operated on the tablet by an operator. When the operator indicates an arbitrary position on the tablet with the input pen, the position is detected by the tablet and information about the position is output to a computer.

The assignee of this application has proposed various input pens and the like for pens and tablets, as disclosed in, for example, Japanese Examined Utility Model Application Publication No. 5-4034. An example of a conventional input pen will now be described with reference to FIG. 13.

FIG. 13 is a cross-sectional view showing the general structure of an input pen 90, as an example of a conventional input pen. Components of the input pen 90 are housed in a penholder 91, which has almost the same shape as that of a writing instrument, such as a ballpoint pen or a fountain pen.

At the leading end of the penholder 91, a lead 92 is disposed so as to be connected to the interior of the penholder 91. The base end of the lead 92 is positioned in a through hole formed in a ferrite core 94, and is fixed to a lead holder 96. The lead holder 96 is fixed to the penholder 91 via a spring 97.

The lead 92 has a ferrite chip 93. In a non-operation state of the input pen 90, approximately two-thirds of the ferrite chip 93 is positioned in the through hole of the ferrite core 94. The lead 92 is supported by the spring 97 together with the lead holder 96, so that it can move in the direction of expansion and contraction of the spring 97, that is, in the axial direction of the penholder 91, and along the through hole of the ferrite core 94.

The ferrite core 94 is cylindrical and has a through hole extending in the longitudinal direction, in which the lead 92 is inserted. A coil 95 is wound on the outer side face of the ferrite core 94, and is connected to a capacitor 98 in the penholder 91 so as to form a tuning circuit 99.

The tuning circuit 99 of the input pen 90 is excited in response to radio waves of a predetermined tuning frequency, for example, a frequency fo, output from a tablet (not shown), and induced voltage is induced in the coil 95. When the output of the waves is stopped, radio waves of a predetermined frequency are output from the coil 95 because of a current passing based on the induced voltage. The tablet receives the waves output from the tuning circuit 99, so that the position of the input pen 90 on the tablet can be detected.

The input pen 90 operates when the leading end of the penholder 91 is pressed against the tablet. During operation, the lead 92 is pushed into the penholder 91, and the ferrite chip 93 built in the lead 92 is moved toward the base end inside the ferrite core 94.

Because the coil 95 is wound on the ferrite core 94, as described, when the positional relationship among the ends of the ferrite core 94 and the ferrite chip 93 is changed, the inductance of the coil 95 is also changed. Therefore, in the tuning circuit 99 including the coil 95, the inductance of the coil 95 is changed by the movement of the ferrite chip 93, thereby changing the tuning frequency of the tuning circuit 99.

In this case, when a radio signal of a frequency fo is output from the tablet, the phase of the induced voltage produced in the coil 95 shifts from that in a non-operation state due to the change in tuning frequency of the tuning circuit 99. For this reason, the tuning circuit 99 outputs radio waves which are different in phase from the waves output from the tablet.

Accordingly, operation of the input pen 90 can be detected by exciting the tuning circuit 99 withradio waves output from the tablet and by detecting the phase difference between the waves and radio waves output from the tuning circuit 99.

As described in the above example, the conventional pen and tablet is easy to use because there is no need to connect the tablet and the input pen, and the operational feeling thereof is similar to that of typical writing instruments, such as fountain pens and ballpoint pens.

The conventional input pen, such as the above-described input pen 90, has a size similar to that of typical writing instruments, such as ballpoint pens, and is suited for use particularly in desktop computers and the like.

In recent years, size reduction of electronic devices has been achieved; for example, portable electronic devices, called "Personal Digital Assistants (PDA)" have become widespread. For this reason, there has also been a demand for size reduction of input devices for use in small electronic devices. It is, however, difficult to achieve a substantial size reduction without changing the constructions of the conventional input pens.

As an example, the above-described input pen 90 must not only be shortened but must also be reduced in diameter for the purpose of size reduction. Therefore, the ferrite core 94 and the lead 92 must also be reduced in diameter.

Since the lead 92 has the ferrite chip 93 therein, however, if it is reduced in diameter, the wall surface of a portion thereof with the ferrite chip 93 therein also becomes thin. Since the lead and the like are made of resin in most cases, such thinning causes insufficient strength, and the lead 92 may undergo plastic deformation due to the load applied during operation. In a case in which the lead 92 is deformed inside the ferrite core 94, it may abut the inner wall of the ferrite core 94 and may be made unable to move. In this state, input operation with the input pen 90 is impossible. Consequently, it is difficult to reduce the diameter of the lead 92.

On the other hand, since the ferrite core 94 has a through hole in which the lead 92 is inserted, the through hole and the peripheral wall must be reduced in diameter in order to permit the ferrite core 94 to also be reduced in diameter. In addition to the difficulty in reducing the diameter of the lead 92, since ferrite is a fragile structural material, if the ferrite core 94 is excessively reduced, cracking may occur due to insufficient strength.

For example, in the step of winding the coil 95 on the ferrite core 94 in the production process of the input pen 90, tension of the wire is applied to the ferrite core 94. Furthermore, while such winding is performed in a state in which the ferrite core 94 is fixed, stress concentrates on the fixed portion of the ferrite core 94 due to the tension of the wire. Therefore, the ferrite core 94 must correspondingly have great strength. In consideration of vibrations during transportation and dropping shock tests for products, the strength which the ferrite core 94 should have is significantly great.

If the ferrite core 94 is cracked, the inductance of the coil 95 is lowered below its initial value, and the tuning frequency of the tuning circuit 99 is offset. For this reason, the input pen 90 may not work as the input device.

Therefore, the lead 92 and the ferrite core 94 in the input pen 90 must have a predetermined large strength, and it is difficult to reduce the size of the input pen 90 without changing the structure thereof.

Size reduction of electronic devices improves portability, but may decrease ease of input operation. For this reason, there has been a demand for a small input device that provides high operability.

SUMMARY OF THE INVENTION

Accordingly, an object of the present invention is to provide a thinner pen-shaped coordinate pointing device which indicates a position to be determined and an operation by an operator to a position detecting device, such as a tablet, for determining the position.

Another object of the present invention is to ensure high operability of a thin pen-shaped coordinate pointing device.

In order to overcome the above problems, according to an aspect of the present invention, there is provided a pen-shaped coordinate pointing device for indicating a position to be determined and an operation by an operator to a position detecting device for determining the position, the pen-shaped coordinate pointing device including: a coil wound on a core having an end face with no opening; and a magnetic member placed along the axis of the coil so as to be opposed to the end face of the core, wherein the core and the magnetic member are spaced from each other and are moved closer together in response to operation by the operator.

For example, the position detecting device has a plurality of loop coils in a flat casing, and it emits radio waves of a predetermined oscillation frequency from the loop coils and detects the position of the pen-shaped coordinate pointing device based on the voltage induced by the radio waves from the coil of the pen-shaped coordinate pointing device. The position detecting device may be formed integrally with a display screen, such as a liquid crystal display panel, and the shape thereof is not limited to a flat shape. The magnetic member is made of, for example, soft ferrite. The core is made of a magnetic member, such as soft ferrite, or of other metals.

In the pen-shaped coordinate pointing device, since the end face of the core does not have any opening, even when the magnetic member and the core are moved closer together, the magnetic member will not enter the interior of the coil.

Accordingly, the inductance of the coil is changed by the movement of the magnetic member closer to the core of the coil, and operation by the operator can be thereby indicated to the position detecting device for determining the position.

Since there is no need to form an opening on the end face of the core, even when the core is reduced in diameter, problems, such as insufficient strength, will not arise. Accordingly, a substantially thin pen-shaped coordinate pointing device can be achieved by reducing the diameter of and placing the core and the magnetic member along the axis of the coil.

Since the core and the magnetic member are moved closer together during operation by the operator, the inductance of the coil increases. A coordinate pointing device used in combination with a position detecting device sometimes has an LC resonance circuit using a variable capacitor, whose capacity changes with pressure in order to detect the operation. In such a coordinate pointing device, when operation is performed by the operator, the capacity of the variable capacitor increases, and, as a result, the resonance frequency of the LC resonance circuit shifts to a lower value. That is, the coordinate pointing device is highly sensitive, whereas it is complicated in structure and is expensive. In the pen-shaped coordinate pointing device of the present invention, since the inductance of the coil increases during operation, the resonance frequency is shifted to a lower value during operation by constructing an LC resonance circuit including the coil. Consequently, a pen-shaped coordinate pointing device, which performs operationally similar to that of the coordinate pointing device using the variable capacitor, can be achieved with a simpler structure and at lower cost.

The change in inductance of the coil during operation is more noticeable as the distance between the coil and the magnetic member decreases. For this reason, operation can be detected more reliably and a smaller pen-shaped coordinate pointing device can be achieved by decreasing the fixed distance between the coil and the magnetic member in an initial state.

Preferably, the pen-shaped coordinate pointing device further includes an elastic member interposed between the end face of the core and the magnetic member.

The elastic member is made of, for example, rubber or flexible resin. The elastic member is formed of, for example, an annular or flat member, a platelike member that partly varies in thickness, or a spherical member.

The elastic member is interposed between the end face of the core and the magnetic member, so that the core and the magnetic member are held with a space therebetween in an initial state before operation. When the core and the magnetic core are moved closer together by operation, they are urged in such a direction as to move apart from each other, and they are returned to the initial state after operation.

Since the return operation is thereby smoothly performed after operation, operability of the pen-shaped coordinate pointing device is improved. That is, high responsivity during operation and a smooth returning mechanism can be provided with a simple structure. The size is easily reduced and the cost is also reduced. Since the amount of deformation of the elastic member due to the force applied thereto generally corresponds to the amount of the force, it is possible to find the amount of deformation of the elastic member based on the amount of change in inductance of the coil and to find thereby the amount of force applied in the operation.

Preferably, the elastic member is in contact with only a part of the end face of the core and is in contact with only a part of a face of the magnetic member opposing the end face of the core, and a part of the end face of the core and a part of the opposing face of the magnetic member are opposed to each other without the elastic member therebetween.

In this case, the elastic member is formed of, for example, a flat plate having a through hole or an annular or spherical member. The elastic member is in contact with only a part of the end face of the core and is in contact with only a part of a face of the magnetic member opposing the end face of the core. That is, the elastic member does not cover the entire end face of the core and the entire opposing face of the magnetic member. A part of the end face of the core and a part of the opposing face of the magnetic member are opposed to each other without the elastic member therebetween. In these parts, magnetic interaction between the core and the magnetic member will not be impeded by the elastic member.

Therefore, the inductance of the coil more noticeably changes during operation in this case than in a case in which the end face of the core or the opposing face of the magnetic member is entirely covered with the elastic member. When a force greater than the elastic force of the elastic member is applied during operation, the core and the magnetic member are moved considerably closer together or are put into contact with each other, which further increases the inductance of the coil.

Since the operation by the operator is thereby detected sensitively and reliably, operability of the pen-shaped coordinate pointing device is improved.

Preferably, at least one of the end face of the core and the face of the magnetic member opposing the end face of the core has a projection having a height less than the thickness of the elastic member.

In this case, a projection and a face or projections are opposed to each other in a portion where the core and the magnetic member are opposed. In other words, the core and the magnetic member are placed closer to each other in an initial state than in a case in which no projection is formed, and they are moved further closer together during operation. Since the height of the projection is smaller than the thickness of the elastic member, the core and the magnetic member are not in contact with each other in the initial state.

The influence of the magnetic member on the inductance of the coil is inversely proportional to the square of the distance between the coil and the magnetic member. Therefore, the inductance of the coil changes more rapidly during operation as the distance therebetween decreases.

Since the projection is provided in the pen-shaped coordinate pointing device of the present invention, it is possible to reduce the distance between the elastic member and the core in the initial state and to quickly move the core and the magnetic member closer to each other during operation. Furthermore, since the height of the projection is smaller than the thickness of the elastic member, the core and the magnetic member can be spaced in a non-operation state only by placing the elastic member therebetween. This prevents the structure from being complicated.

Since the inductance of the coil changes during operation and operation by the operator can be reliably detected by the position detecting device, responsivity and operability can be improved.

Preferably, the elastic member is an annular member having a through hole connected to the end face of the core and the opposing face of the magnetic member, and the projection projects into the through hole of the elastic member.

In this case, when the core and the magnetic member are moved closer together by operation, the annular elastic member is deformed, and the projection projecting into the through hole of the elastic member is moved closer to the opposing face or projection.

When the pen-shaped coordinate pointing device is operated, the annular elastic member is pressed and deformed so as to project in the horizontal direction, and is deformed by a relatively small force. Therefore, the core and the magnetic core can be easily moved close together by small force. This allows the pen-shaped coordinate pointing device to be easily operated by a relatively small force with little resistance.

Preferably, the elastic member is an annular member in linear contact with the end face of the core and the opposing face of the magnetic member, the projection has a side face formed along the inner side face of the elastic member, and both the magnetic member and the core are cylindrical.

In this case, the elastic member is formed of an annular member, such as an O-ring, in linear contact with the core and the magnetic member, and is easily and elastically deformed when the core and the magnetic member are moved closer together. The projection has a side face formed along the inner side face of the elastic member and projects into the space in the center of the elastic member. The elastic member is supported by the contact between the inner side face of the elastic member and the side face of the projection. Both the core and the magnetic member are cylindrical.

Since the elastic member is reliably deformed even by a small force so that the core and the magnetic member are moved close together, the pen-shaped coordinate pointing device can be operated with small resistance during operation by a relatively small force. Since the projection supports the elastic member, the relative position among the core, the magnetic member, and the elastic member can be prevented from being displaced during operation, and reliability of the pen-shaped coordinate pointing device is improved. Furthermore, since the core and the magnetic member are placed along the axis of the core, easy positioning is possible when placing the elastic member between the core and the magnetic member.

Preferably, the core and the magnetic member are held in a pen-shaped casing, a lead is disposed at the leading end of the casing so as to be movably insertable into the casing, and the magnetic member is connected to the base end of the lead.

In this case, when the lead is pushed into the casing by operation of the operator, the magnetic member moves close to the core together with the lead, thereby changing the inductance of the coil.

Therefore, the magnetic member is reliably moved close to the core in response to operation of the operator even in a situation in which it is difficult to transmit the force of operation, for example, when the operator operates the pen-shaped coordinate pointing device while tilting the casing. This ensures reliable response to the operation by the operator and improves operability.

Since the magnetic member is disposed outside the lead, there is no need to form a space or the like for holding the magnetic member inside the lead, and this allows the lead to be reduced in diameter. That is, if a space is formed inside the lead so as to hold the magnetic member therein, the wall portion around the space is thin-walled. Therefore, the lead must not be reduced in order to ensure a strength sufficient for use. Since the lead does not have a magnetic member therein in the pen-shaped coordinate pointing device of the present invention, insufficient strength will not be caused even when the lead is reduced. For this reason, the pen-shaped coordinate pointing device can be reduced by reducing the diameter of the lead. When the lead is reduced, only a small hole is needed at the leading end of the casing for passing the lead therethrough, and therefore, the casing can be reduced easily. Moreover, when the lead serving as the pen point is reduced, efficiency in fine operation is enhanced. For example, the casing can be substantially reduced by arranging the lead, the magnetic member, the elastic member, and the core in series along the axis of the core.

This can further reduce the diameter of the pen-shaped coordinate pointing device.

Further objects, features, and advantages of the present invention will become apparent from the following description of the preferred embodiments with reference to the attached drawings.

BRIEF DESCRIPTION OF THE DRAWINGS

FIG. 5 is a flowchart showing the operation of a control circuit shown in FIG. 2.

FIGS. 6A to 6C are timing charts showing signal detecting operations in the tablet shown in FIG. 2. FIG. 6A shows sinusoidal signals transmitted to the loop coils of the tablet, FIG. 6B shows the state of switching between a transmission period and a reception period, and FIG. 6C shows detected voltages of the loop coils in the tablet.

FIG. 7A is a graph showing the results of tests concerning the load applied to the input pen and the pen pressure detected by the coordinate input device, and FIG. 7B shows conditions of the tests.

FIG. 8A shows the structure shown in FIG. 1, FIG. 8B shows a second embodiment, and FIG. 8C shows a third embodiment.

FIG. 10A is a perspective view showing the structure of the ferrite chip shown in FIG. 9A, and FIG. 10B is a perspective view showing the structure of another ferrite chip.

FIG. 11A is a perspective view showing the structure of a projection shown in FIG. 1, FIG. 11B is a perspective view showing the structure of another ferrite chip, FIG. 11C is a perspective view showing the structure of a further ferrite chip, FIG. 11D is a perspective view showing the structure of the O-ring shown in FIG. 1, FIG. 11E is a cross-sectional view of the O-ring, FIG. 11F is a perspective view showing the structure of another O-ring, and FIG. 11G is a cross-sectional view of the O-ring.

DESCRIPTION OF THE PREFERRED EMBODIMENTS

A pen-shaped coordinate pointing device according to a preferred embodiment of the present invention will be described below with reference to FIGS. 1 to 12.

Figure 1:
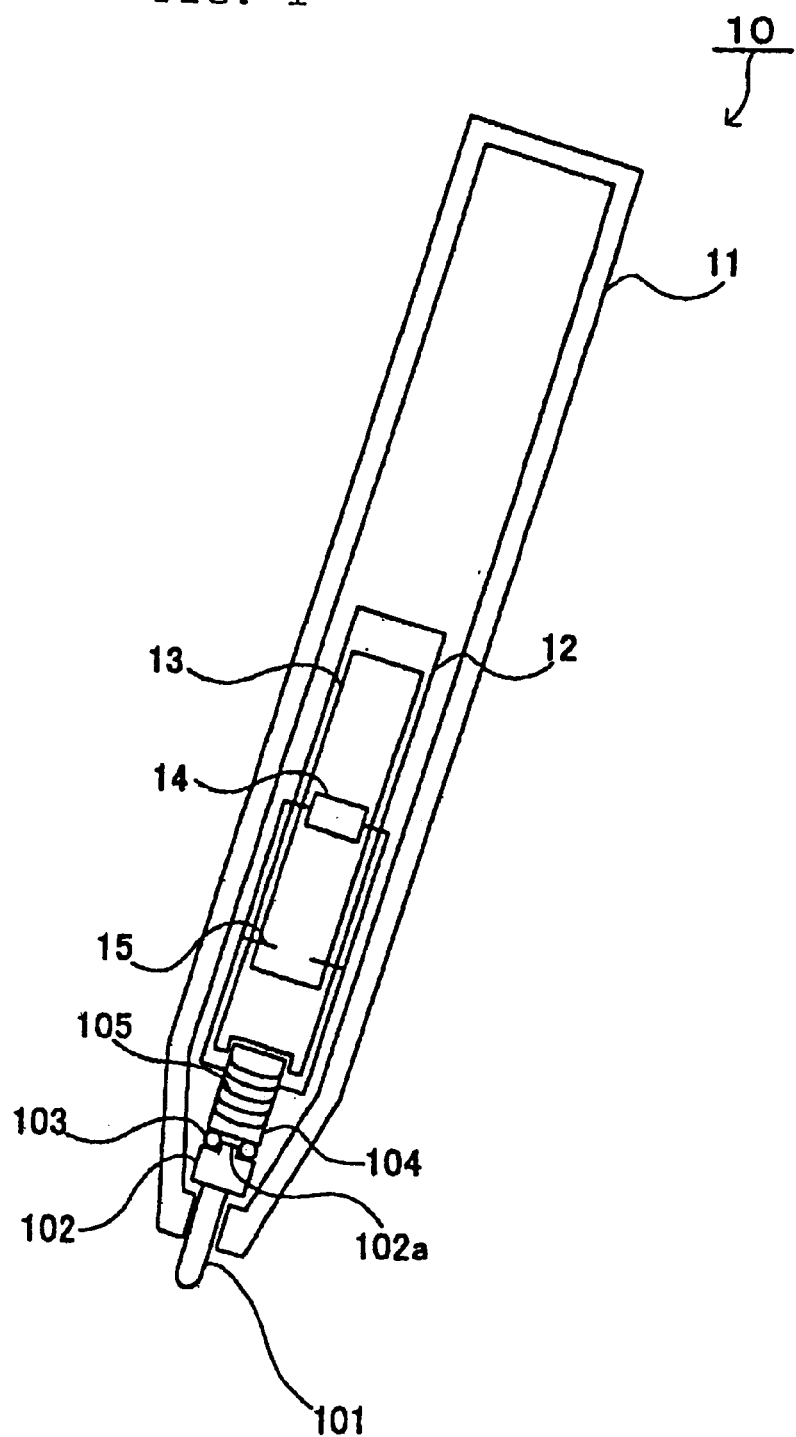
FIG. 1 is a cross-sectional view showing the structure of an input pen according to an embodiment of the present invention.

FIG. 1 is a cross-sectional view showing the configuration of an input pen 10 serving as a pen-shaped coordinate pointing device of this embodiment. Referring to FIG. 1, the input pen 10 comprises a casing 11, a substrate holder 12, a substrate 13, a capacitor 14, a tuning circuit 15, a lead 101, a ferrite chip 102, an O-ring 103, a ferrite core 104, and a coil 105. The ferrite chip 102 has a projection 102a. FIG. 1 shows the input pen 10 in a non-operation state.

The casing 11 is a hollow housing made of synthetic resin or metal so as to resemble typical writing instruments, such as ballpoint pens and mechanical pencils, and so as to be smaller than those instruments. The rodlike lead 101 is disposed at the leading end of the casing 11 so as to be movably insertable into the casing 11, and the ferrite chip 102 is fixed to the base end of the lead 101. The ferrite chip 102 is a piece of ferrite magnet, such as soft ferrite, and is placed opposed to the leading end of the ferrite core 104 via the flexible O-ring 103.

The ferrite core 104 is shaped like a rod of circular or rectangular cross section. The leading end face thereof is disposed opposed to the ferrite chip 102 and the base end portion thereof is fixed to the substrate 13. The coil 105 is wound on the side face of the ferrite core 104.

The substrate 13 is formed of a printed circuit board or the like having the capacitor 14 and the like mounted thereon, and is fixed to the casing 11 via the substrate holder 12. The capacitor 14 is a well-known type of element. The capacitor 14 and other elements mounted on the substrate 13, and the coil 105 constitute the tuning circuit 15.

The leading end face of the ferrite core 104 is substantially smooth. At almost the center of a face of the ferrite chip 102 opposed thereto, the projection 102a shaped like, for example, a cylinder is formed.

The O-ring 103 is made of synthetic resin, synthetic rubber, or the like and is shaped like the letter O. The O-ring 103 has a through hole in the planar center, in which the projection 102a of the ferrite chip 102 is positioned.

Accordingly, the end face of the ferrite core 104 and the projection 102a are opposed to each other via the O-ring 103. Furthermore, the O-ring 103 holds the ferrite chip 102 and the ferrite core 104 with a space therebetween, and elastically deforms when pressing force is applied in a direction to move the ferrite chip 102 and the ferrite core 104 together.

Figure 2:
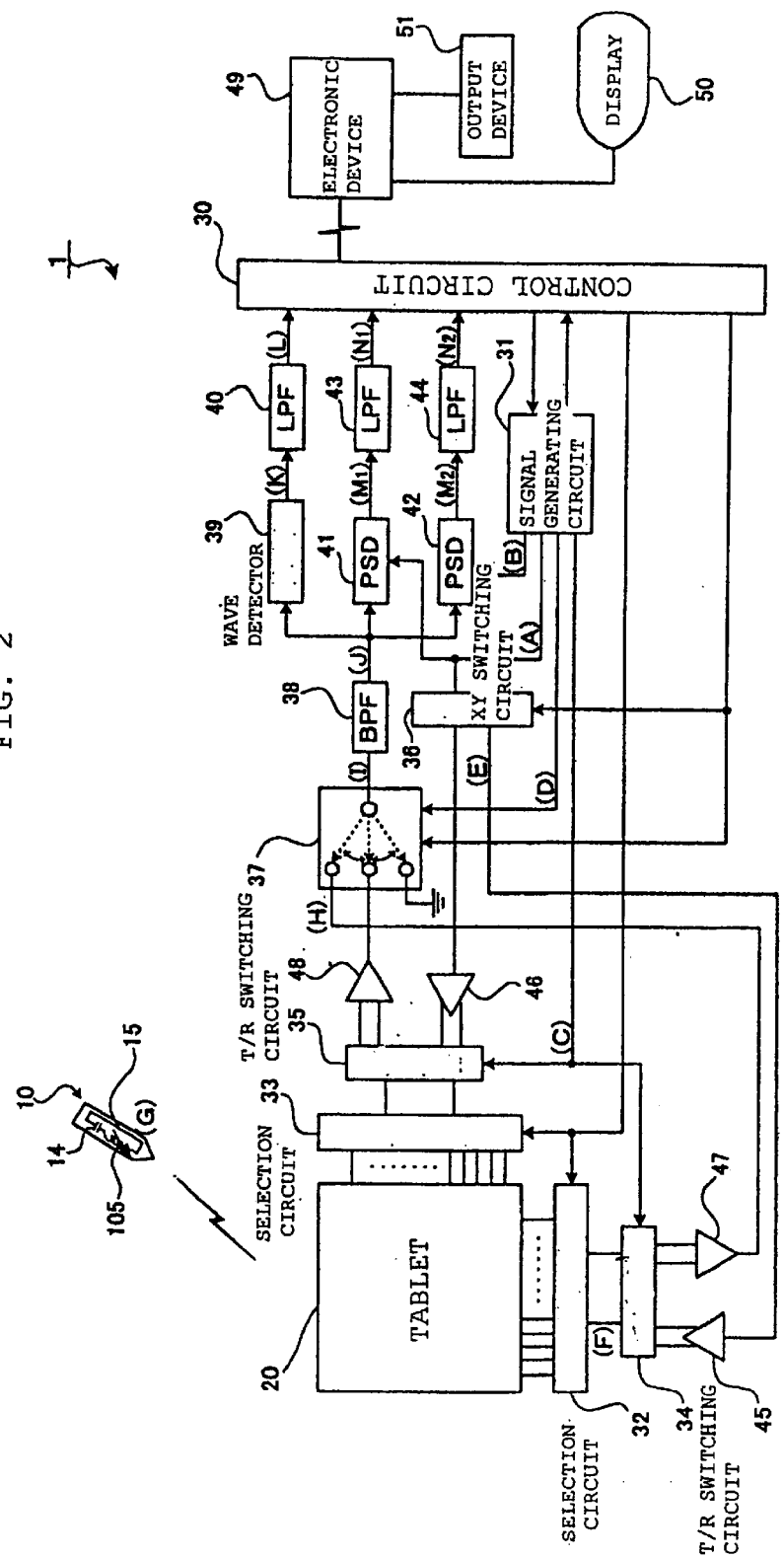
FIG. 2 is a circuit diagram showing the configuration of a coordinate input device including the input pen shown in FIG. 1.

The input pen 10 is operated on a substantially flat tablet 20 (see FIG. 2). During operation, the input pen 10 is held so that the leading end of the casing 11 points downwardly, in a manner similar to that of typical writing instruments, and is operated so that the lead 101 is pressed against the tablet 20.

When the lead 101 is pushed into the casing 11 by pressing the input pen 10 against tablet 20, the ferrite chip 102 and the lead 101 move toward the ferrite core 104, the O-ring 103 is elastically deformed, and the ferrite chip 102 is moved closer to the ferrite core 104.

With the ferrite chip 102 closer to the ferrite core 104, the inductance of the coil 105 wound on the ferrite core 104 is changed. That is, the inductance of the coil 105 is changed when the input pen 10 is operated.

A coordinate input device 1 including the input pen 10 will now be described.

FIG. 2 is a circuit diagram showing the configuration of the coordinate input device 1. The coordinate input device 1 comprises a control circuit 30, a signal generating circuit 31, X-direction and Y-direction selection circuits 32 and 33, transmit/receive switching circuits 34 and 35, an XY switching circuit 36, a receive-timing switching circuit 37, a band-pass filter (BPF) 38, a wave detector 39, a low-pass filter (LPF) 40, phase shift detectors (PSD) 41 and 42, low-pass filters (LPF) 43 and 44, driving circuits 45 and 46, amplifiers 47 and 48, an electronic device 49, a display device 50, and an output device 51.

Available as the electronic device 49 are, for example, personal computers or personal digital assistants (PDA) having the display device 50, such as a liquid crystal display (LCD), disposed in combination therewith or externally connected thereto, or portable terminals having a wireless communication function. Available as the output device 51 are, for example, printers, wireless communication devices, various disk drives, and various semiconductor memory devices which are combined with or externally connected to the electronic device 49.

Figure 3:
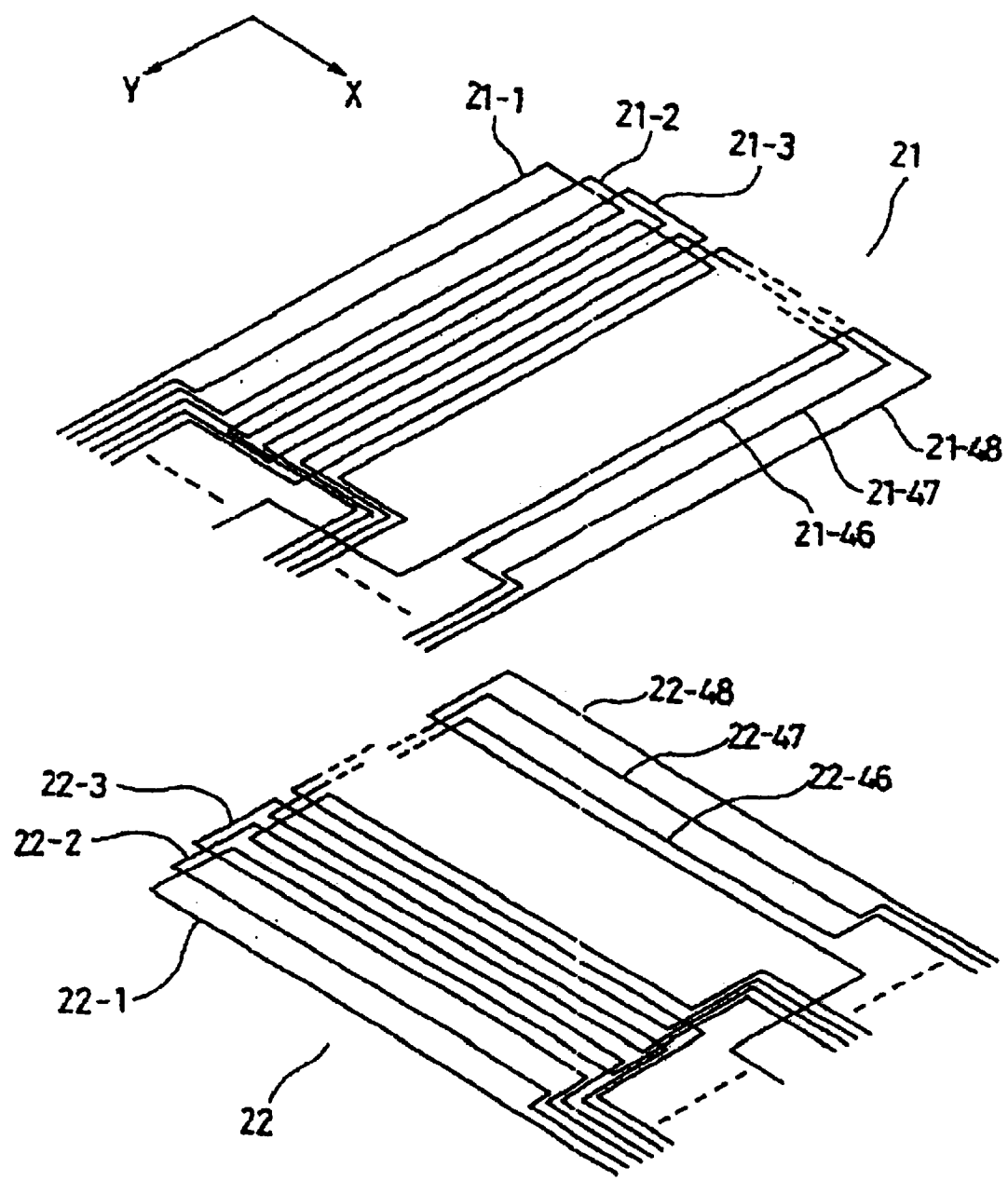
FIG. 3 is an exploded perspective view showing the structure of the principal part of a tablet shown in FIG. 2, more particularly, showing the layout of X-direction loop coils and Y-direction loop coils constituting the tablet.

FIG. 3 is an exploded perspective view showing the structure of the principal part of the tablet 20 shown in FIG. 2, and, more particularly, shows the layout of a group of X-direction loop coils 21 and a group of Y-direction loop coils 22 constituting the tablet 20.

Referring to FIG. 3, the tablet 20 includes the group of X-direction loop coils 21 extending in the X direction and the group of Y-direction loop coils 22 extending in the Y direction. The X and Y directions are orthogonal to each other.

The group of X-direction loop coils 21 is comprised of multiple loop coils arranged in parallel to one another in the X-direction and overlapping with one another, for example, forty-eight loop coils 21-1, 21-2, . . . , 21-48. Similarly, the group of Y-direction loop coils 22 is comprised of multiple loop coils arranged in parallel to one another in the Y-direction and overlapping with one another, for example, forty-eight loop coils 22-1, 22-2, . . . , 22-48.

The X-direction loop coils 21 and the Y-direction loop coils 22 overlap, and are housed in a casing (not shown) made of a nonmetal material. In FIG. 3, the loop coils 21 and the loop coils 22 are separate, for convenience of understanding. While each of the loop coils 21-1 to 21-48 and 22-1 to 22-48 consists of one turn, it may consist of a plurality of turns, as appropriate.

The configuration and operation of the coordinate input device 1 will now be described.

First, description will be given of transmission and reception of radio waves between the input pen 10 and the tablet 20, and signals obtained thereby with reference to FIGS. 2 and 3, and FIG. 4 as a timing chart. While substantially identical signals are denoted by respective letters in the timing chart shown in FIG. 4, the chart of only one of them is shown.

The control circuit 30 shown in FIG. 2, such as a known microprocessor, controls the signal generating circuit 31 and controls switching among the loop coils in the tablet 20 via the selection circuits 32 and 33 according to the flowchart shown in FIG. 5, which will be described later. The control circuit 30 also controls the XY switching circuit 36 and the receive-timing switching circuit 37 so as to switch between coordinate detecting directions.

Furthermore, the control circuit 30 subjects output values from the LPFs 40, 43, and 44 to analog-digital conversion and computation, which will be described later, thereby finding a coordinate value of a position indicated by the input pen 10. The control circuit 30 also detects the phases of received signals and transmits the phases to the electronic device 49.

The selection circuit 32 sequentially selects one of the X-direction loop coils 21 (see FIG. 3). The selection circuit 33 sequentially selects one of the Y-direction loop coils 22. The selection circuits 32 and 33 are operated according to information from the control circuit 30.

The transmit/receive switching circuit 34 alternately connects one X-direction loop coil selected by the selection circuit 32 to the driving circuit 45 and to the amplifier 47. The transmit/receive switching circuit 35 alternately connects one Y-direction loop coil selected by the selection circuit 33 to the driving circuit 46 and to the amplifier 48. The transmit/receive switching circuits 34 and 35 are operated in response to a transmit/receive switching signal C, which will be described later.

Figure 4:
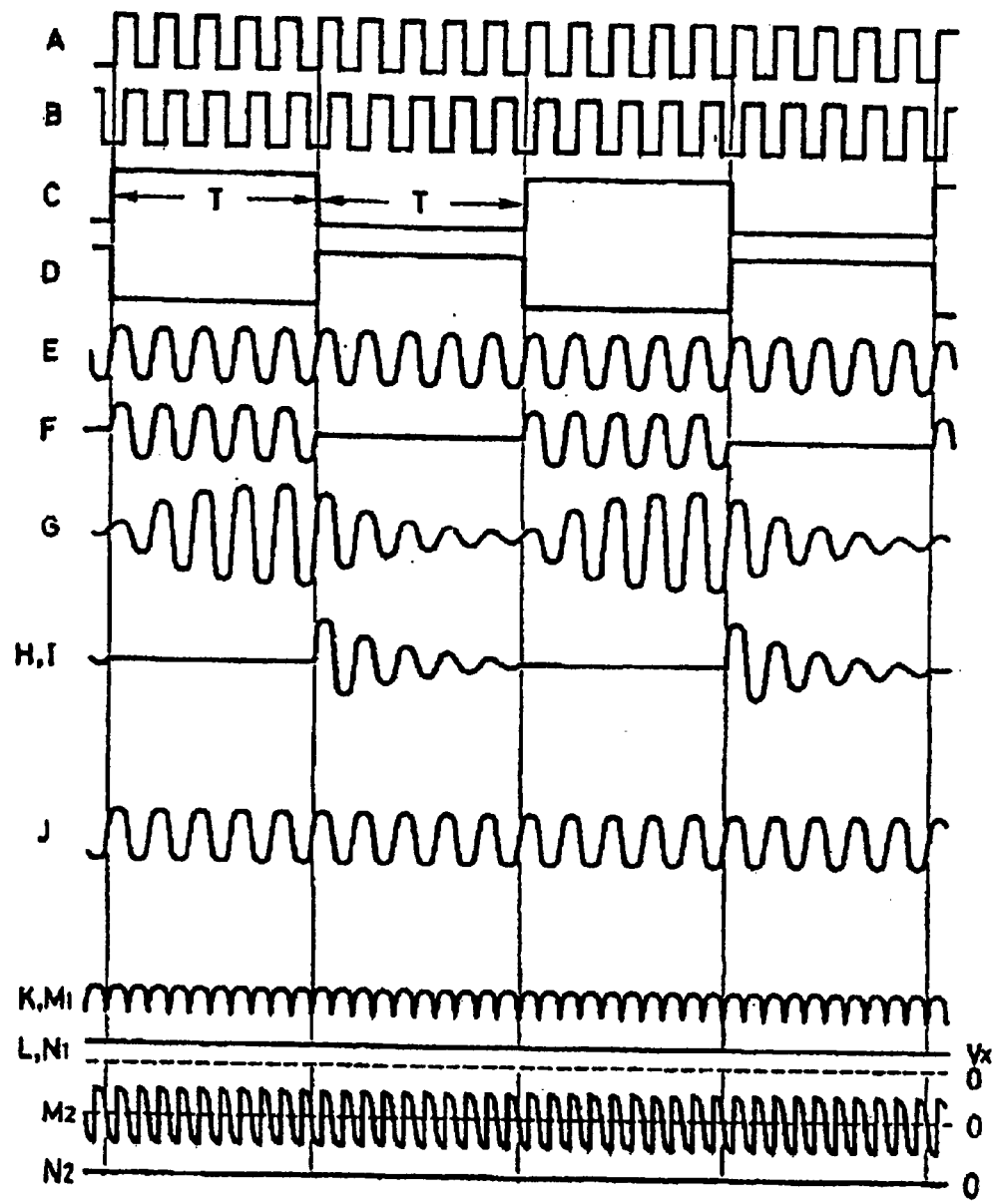
FIG. 4 is a timing chart showing signals in the coordinate input device shown in FIG. 2.

The signal generating circuit 31 generates and outputs a rectangular wave signal A of a predetermined frequency fo, for example, 500 kHz, a signal B that lags 90° behind the rectangular wave signal A, a transmit/receive switching signal C of a predetermined frequency fκ, for example, 16.625 kHz, and a receive-timing signal D, as best shown in FIG. 4.

The rectangular wave signal A output from the signal generating circuit 31 is sent unchanged to the PSD 41, is converted into a sinusoidal signal E by a low-pass filter (not shown), and is sent to either of the driving circuits 45 and 46 via the XY switching circuit 36. The rectangular wave signal B output from the signal generating circuit 31 is sent to the PSD 42, the transmit/receive switching signal C is sent to the transmit/receive switching circuits 34 and 35, and the receive-timing signal D is sent to the receive-timing switching circuit 37.

In a state in which information that the X direction is to be selected is input from the control circuit 30 to the XY switching circuit 36 and the receive-timing switching signal 37, the sinusoidal signal E output from the signal generating circuit 31 is sent to the driving circuit 45 to be converted into an equilibrium signal, and is sent to the transmit/receive switching circuit 34. Since the transmit/receive switching circuit 34 selects and connects one of the driving circuit 45 and the amplifier 47 based on the transmit/receive switching signal C, it outputs to the selection circuit 32 a signal F obtained by alternately switching between the output and stop of the signal E of 500 kHz every time T (=½ fκ), every 32 μsec in this embodiment.

The signal F output from the transmit/receive switching circuit 34 is sent to one X-direction loop coil 21-i (i=1, 2, . . . , 48) in the tablet 20 via the selection circuit 32. In the loop coils 21-i, radio waves are generated based on the signal F.

If it is assumed that a period in which the signal F is being output to the selection circuit 32 is designated a transmission period and a period in which the signal F is not being output to the selection circuit 32 is designated a reception period, the transmission period and the reception period are alternately repeated every time T described above, as shown in the timing chart in FIG. 4.

When the input pen 10 is held on the tablet 20 in a substantially upright position, that is, in an operation state, the coil 105 (FIG. 1) in the input pen 10 is excited by the radio waves generated by the loop coil 21-i, and an induced voltage G is generated in the tuning circuit (FIG. 1) in synchronization with the signal F.

Subsequently, the reception period, in which the signal F is not output, is brought about by the action of the transmit/ receive switching circuit 34, and the loop coil 21-i is switched to the amplifier 47. The radio waves from the loop coil 21-ii then disappear immediately, whereas the induced voltage G generated in the tuning circuit 15 of the input pen 10 is gradually attenuated in response to the loss in the tuning circuit 15.

Radio waves are sent from the coil 105 because of a current passing through the tuning circuit 15 based on the induced voltage G. The loop coil 21-i connected to the amplifier 47 is excited and an induced voltage is generated therein by the radio waves from the coil 105. During the reception period, the induced voltage is sent from the transmit/receive switching circuit 34 to the amplifier 37, is amplified into a reception signal H, and is sent to the receive-timing switching circuit 37.

Input to the receive-timing switching circuit 37 are one of X-direction selection information and Y-direction selection information, X-direction selection information in this embodiment, and a receive-timing signal D which is substantially an inverted signal of the transmit/receive switching signal C. The receive-timing switching circuit 37 outputs a reception signal H while the signal D is at the "Hi" level, and does not output any signal while the signal D is at the "Lo" level. Consequently, the receive-timing switching circuit 37 outputs a signal I substantially identical to the reception signal H.

The signal I is sent to the BPF 38. The BPF 38 is a ceramic filter having a natural frequency of fo, and sends a signal J, which has an amplitude in accordance with the energy of a component of fo in the signal I, to the wave detector 39 and the PSDs 41 and 42. More precisely, the BPF 38 sends the signals J to the wave detector 39 and the PSDs 41 and 42 in a state in which several signals I are input and stored therein.

The signal J input to the wave detector 39 is detected and rectified into a signal K. The signal K is converted into a direct-current signal L, which has a voltage corresponding to about half the amplitude of the signal J, for example, Vx, by the LPF 40 which blocks a sufficiently low frequency, and is then sent to the control circuit 30.

The voltage Vx of the signal L is based on the induced voltage induced in the loop coil 21-i and depends on the distance between the input pen 10 and the loop coil 21-i, in this embodiment, a value substantially inversely proportional to the fourth power of the distance. For this reason, when the loop coil 21-i is switched to another loop coil, the voltage value Vx of the signal L varies.

Accordingly, the X-direction coordinate value of a position indicated by the input pen 10 can be found by converting the voltage value Vx obtained for each loop coil into a digital value and subjecting the digital value to computation, which will be described later, and by thereby finding the positional relationship between the loop coil and the input pen 10. The Y-direction coordinate value of the position indicated by the input pen 10 can be obtained similarly.

On the other hand, a rectangular wave signal A generated by the signal generating circuit 31 is input as a detection signal to the PSD 41, and a rectangular wave signal B, which lags 90° behind the rectangular wave signal A, is input as a detection signal to the PSD 42.

In the case in which the phase of the signal J substantially coincides with the phase of the rectangular wave signal A, the PSD 41 outputs a signal M1 obtained by inverting the signal J to the positive, and the PSD 42 outputs a signal M2 having a waveform that is symmetric on the positive and negative. The signal M1 output from the PSD 41 is substantially identical to the signal K.

In a manner similar to that of the above signal K, the signal M1 is converted, by the LPF 43, into a direct current signal N1 having a voltage corresponding to about half the amplitude of the signal J, that is, Vx, and is sent to the control circuit 30. The direct current signal N1 is substantially identical to the signal L.

Similarly, the signal M2 is converted into a direct current signal N2 by the LPF 44, and is sent to the control circuit 30. Since the signal M2 from the PSD 42 has identical components on the positive side and the negative side in this embodiment, as shown in FIG. 4, the voltage of the output from the LPF 44 is 0 V.

The control circuit 30 converts the output values from the LPFs 43 and 44, the signals N1 and N2 in this embodiment, into digital values and subjects the digital values to computation represented by the following formula (1), thereby finding a phase difference θ between the signals applied to the PSDs 41 and 42, that is, between the signal J and the rectangular wave signal A in this embodiment:

$$\theta = -\tan^{-1}(VQ/VP) \tag{1}$$

wherein VP represents the digital value corresponding to the output from the LPF 43, and VQ represents the digital value corresponding to the output from the LPF 44.

For example, in the case of the signal J described above, the voltage of the signal N1 is Vx, and the voltage of the signal N2 is 0 V, that is, VQ equals 0. Therefore, the phase difference θ equals 0°.

The phase of the signal J varies depending on the tuning frequency of the tuning circuit 15 in the input pen 10. That is, in the case in which the tuning frequency of the tuning circuit 15 is equal to the predetermined frequency fo, an induced voltage of a frequency fo is generated in the tuning circuit 15 during both the signal transmission and reception periods, and an induced current passes in synchronization therewith. Therefore, the frequency and phase of the received signal H (or I) coincide with those of the rectangular wave signal A, and the phase of the signal J also coincides with that of the rectangular wave signal A.

In contrast, in the case in which the tuning frequency of the tuning circuit 15 does not coincide with the predetermined frequency fo, for example, in which f1 is slightly lower than the frequency fo, an induced voltage of the frequency fo is generated in the tuning circuit 15 during the transmission period, whereas it causes an induced current, which lags in phase, to pass through the tuning circuit 15. During the reception period, an induced voltage of a frequency substantially equal to the frequency f1 is generated, and an induced current passes in synchronization therewith. Therefore, the frequency of the received signal H (or I) is slightly lower than the frequency of the rectangular wave signal A and the phase thereof also lags.

As described above, since the BPF 38 has only the frequency fo as the natural frequency, the shift of the frequency of a signal input thereto toward the lower side is output as a phase lag. Consequently, the phase of the signal J further lags behind that of the received signal H (or I).

Conversely, in the case in which the tuning frequency of the tuning circuit 15 is slightly higher than the predetermined frequency fo, for example, in which the tuning frequency of the tuning circuit 15 is f2, an induced voltage of a frequency fo is generated in the tuning circuit 15 and an induced current advanced in phase passes therethrough during a transmission period, and an induced voltage of a frequency substantially equal to the frequency f2 and an induced current in synchronization therewith are generated during a reception period. Therefore, the frequency of the received signal H (or I) is slightly higher than that of the rectangular wave signal A and the phase thereof slightly advances. Since the shift of the frequency of a signal input to the BPF 38 toward the higher level is output as a phase advance, conversely to the above case, the phase of the signal J further advances before that of the received signal H (or I).

As described above, when the input pen 10 is operated, ferrite chip 102 moves closer to the ferrite core 104, and, therefore, the inductance of the coil 105 increases and the tuning frequency of the tuning circuit 15 decreases. This decrease in tuning frequency corresponds to the amount of change in inductance of the coil 105, that is the amount of deformation of the O-ring 103.

Accordingly, it is possible to find the amount of deformation of the O-ring 103, that is the force applied during the operation of the input pen 10, based on the phase difference θ obtained by the computation represented by the above formula (1) in the control circuit 30.

Description will now be given of an operation of detecting the coordinates indicated by the input pen 10 and a phase detecting operation, with reference to FIGS. 5 and 6. FIG. 5 is a flowchart showing the operation of the control circuit 30, and FIGS. 6A to 6C are timing charts showing a signal detecting operation in the tablet 20. FIG. 6A shows sinusoidal signals to be sent to a loop coils in the tablet 20, FIG. 6B shows the state of switching between a transmission period and a reception period, and FIG. 6C shows detection signals at the loop coils in the tablet 20.

When the coordinate input device 1 is powered on and put into a measurement starting state, the control circuit 30 (FIG. 2) sends information that the X direction is to be selected to the XY switching circuit 36 and the receive-timing switching circuit 37, also sends information that the first loop coil 21-1 from the X-direction loop coils 21-1 to 21-48 (FIG. 3) in the tablet 20 is to be selected to the selection circuit 32, and connects the loop coil 21-1 to the transmit/receive switching circuit 34.

Subsequently, the transmit/receive switching circuit 34 alternately connects the loop coil 21-1 to the driving circuit 45 and to the amplifier 47 based on a transmit/receive switching signal C output from the signal generating circuit 31. In this case, the driving circuit 45 outputs to the loop coil 21-1 sixteen sinusoidal signals of 500 kHz shown in FIG. 6A during a transmission period of 32 μsec.

Switching between transmission and reception by the transmit/receive switching circuits 34 and 35 is repeated seven times for one loop coil, the loop coil 21-1 in this case, as shown in FIG. 6B. Such a period in which transmission and reception are switched seven times corresponds to a selection period (448 μsec) for each loop coil.

The selection period of 448 μsec includes seven reception periods for one loop coil. An induced voltage is output from the amplifier 47 during each reception period.

The obtained induced voltage is sent to the BPF 38 via the receive-timing switching circuit 37 so as to be averaged, and is sent to the control circuit 30 via the wave detector 39, the PSDs 41 and 42, and the LPFs 40, 43, and 44.

The control circuit 30 inputs an output value from the LPF 40 after A/D conversion and temporarily stores the output value as a detected voltage depending on the distance between the input pen 10 and the loop coil 21-1, for example, Vx1.

Next, the control circuit 30 sends information that the loop coil 21-2 is to be selected to the selection circuit 32 and connects the loop coil 21-2 to the transmit/receive switching circuit 34. The control circuit 30 then obtains and stores a detected voltage Vx2 in proportion to the distance between the input pen 10 and the loop coil 21-2. Subsequently, the control circuit 30 sequentially connects the loop coils 21-3 to 21-48 to the transmit/receive switching circuit 34 and stores detected voltages Vx3 to Vx48 (partly shown in an analog form in FIG. 6C) depending on the distance between the loop coils and the input pen 10 in the X direction, as shown in FIG. 6C (the above operations are performed in Step S1 in FIG. 5).

Since obtaining detected voltages for all the loop coils takes much time and is inefficient, in actuality, detected voltages are obtained only for a loop coil which is closest to a position (xp) where the input pen 10 is placed, and several loop coils preceding and succeeding that loop coil. It is noted that detected voltages for remaining the loop coils are minute and negligible.

The control circuit 30 checks whether the detected voltage stored in Step S1 exceeds a predetermined detection level (Step S2). When the voltage is lower than the predetermined detection level (No in Step S3), operations of selecting each loop coil and detecting the voltage thereof are repeated again. When the voltage exceeds the predetermined detection level (Yes in Step S3), the next step is performed.

In the level check executed in Step S2, the control circuit 30 checks whether the highest value of the detected voltages reaches the detection level and which loop coil has the highest detected voltage. If the detected voltage does not reach the detection level, the control circuit 30 stops subsequent operations, such as coordinate calculation, or sets a loop coil which is the center one of the loop coils to be selected in the next coordinate detecting operation and phase detecting operation.

Subsequently, the control circuit 30 transmits information that the Y direction is to be selected to the XY switching circuit 36 and the receive-timing switching circuit 37, causes the selection circuit 33 and the transmit/receive switching circuit 35 to perform switching, in a manner similar to that in Step S1, and temporarily stores a detected voltage depending on the distance between the input pen 10 and each of the Y-direction loop coils 22-1 to 22-48 which is obtained by subjecting the output value of the LPF 40 to A/D conversion when a radio wave is transmitted and received (Step S4).

After that, the control circuit 30 checks the levels of the stored detected voltages (Step S5). When the detected voltage is lower than a predetermined detection level (No in Step S6), selection and voltage detection of each of the Y-direction loop coils are performed again. When the detected voltage is equal to or higher than the predetermined level (Yes in Step S6), the X-direction and Y-direction coordinate values of the position indicated by the input pen 10 are calculated based on the stored voltage values (Step S7).

Description will now be given of an example of an operation to be performed in Step S7.

One method for obtaining the X-direction or Y-direction coordinate value, for example the above-described coordinate value xp, is to approximate the waveform near the highest value of the detected voltages Vx1 to Vx48 to an appropriate function and to find the coordinate of the maximum value of the function.

For example, the maximum detected voltage Vx3 and the detected voltages Vx2 and Vx4 on both sides thereof shown in FIG. 6C can be approximated to quadratic functions as follows.

In the following formulas (2) to (7), the coordinate values of the center positions of the loop coils 21-1 to 21-4 are designated x1 to x48, and the distance therebetween is designated Δx.

First, the following formulas (2), (3), and (4) hold so as to show the relationship between the detected voltages and the coordinate values. In the following formulas (2) to (4), a and b are constants (a<0).

$$Vx2=a(x2-xp)^2+b \quad (2)$$

$$Vx3=a(x3-xp)^2+b \quad (3)$$

$$Vx4=a(x4-xp)^2+b \quad (4)$$

The following formulas (5) and (6) hold for the coordinate values of the center positions of the loop coils.

$$x3-x2=\Delta x \quad (5)$$

$$x4-x2=2\Delta x \quad (6)$$

By substituting the formulas (5) and (6) in the formulas (3) and (4), the following formula (7) is derived.

$$xp=x2+\Delta x/2\{(3Vx2-4Vx3+Vx4)/(Vx2-2Vx3+Vx4)\} \quad (7)$$

In this way, the highest detected voltage and the adjacent detected voltages are derived from the detected voltages Vx1 to Vx48 of the loop coils obtained in the level check in Step S2, and computation corresponding to the above formula (7) is performed based on the derived voltages and the coordinate values (known) of a loop coil precedent to the loop coil with the highest detected voltage, thereby calculating the coordinate value xp of the input pen 10.

Subsequently, the control circuit 30 sends to the selection circuit 32 (or 33) information that the loop coil (peak coil) having the highest detected voltage is to be selected from the X-direction loop coils 21-1 to 21-48 (or Y-direction loop coils 22-1 to 22-48) (Step S8), repeats transmission and reception of waves to and from the input pen 10 a plurality of times, for example, seven times, subjects output values from the LPFs 43 and 44 to A/D conversion (Step S9), and calculates the phase difference θ as described above (Step S10).

The obtained phase difference θ is adjusted by, for example, addition of 40° performed by the control circuit 30, is converted into phase information representing the pen pressure, and is output to the electronic device 49 together with the coordinate values of the position indicated by the input pen 10 which has been found in Step S7 (Step S11).

When the first coordinate detecting and phase detecting operations are completed through the above-described steps S1 to S11, the control circuit 30 sends to the selection circuit 32 information that only a fixed number of, for example ten, loop coils centered on a loop coil having the highest detected voltage, are to be selected from the X-direction loop coils 21-1 to 21-48 in the second and subsequent coordinate detecting operations. Similarly, the control circuit 30 sends to the selection circuit 33 information that only a fixed number of, for example ten, loop coils centered on a loop coil having the highest detected voltage are to be selected from the Y-direction loop coils 22-1 to 22-48. Then, the output values are similarly obtained, and the X-direction and Y-direction coordinate detecting operation and phase detecting operation are performed for the position indicated by the input pen 10. The obtained coordinate values and the phase information are transferred to the electronic device 49. These operations are repeated subsequently.

This makes it possible to obtain the coordinates of a position indicated by the input pen and information about the pen pressure as necessary.

The structure of the input pen 10 thus used in the coordinate input device 1 will now be described in detail.

Figure 7A:
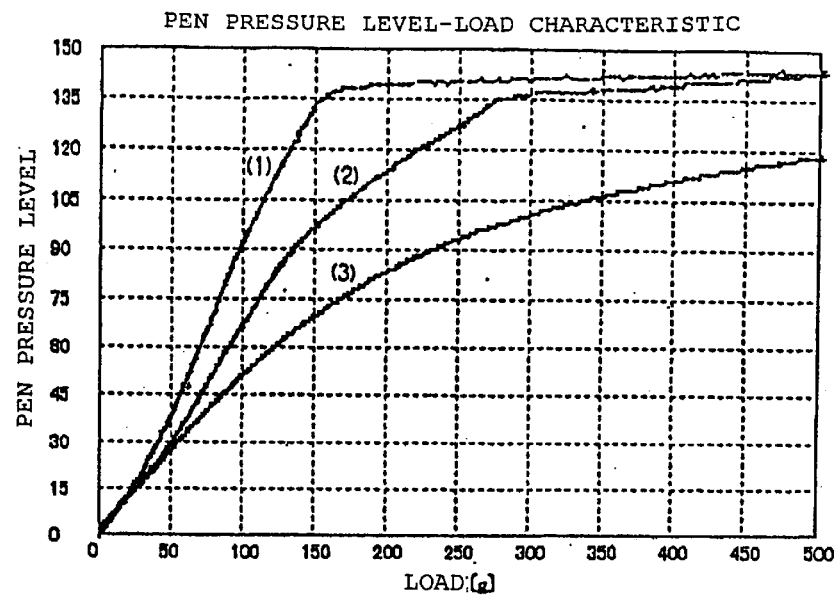
FIGS. 7A and 7B show the relationship between the height of a projection formed on a ferrite chip shown in FIG. 1 and the detection state in the coordinate input device shown in FIG. 2.
Figure 7B:
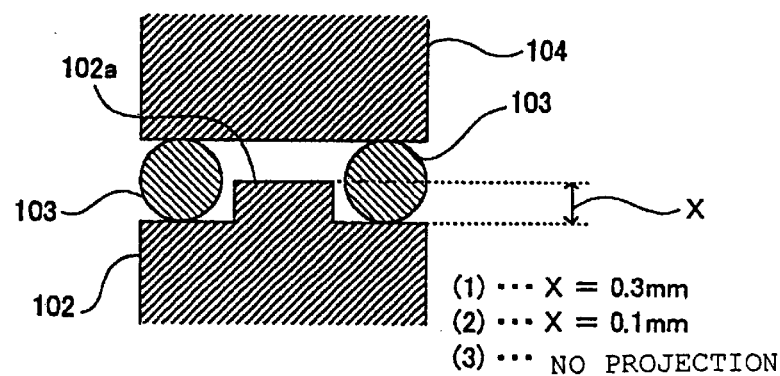

FIGS. 7A and 7B show the height of the projection 102a formed on the ferrite chip 102 and the detection state in the coordinate input device 1. FIG. 7A is a graph showing the results of tests conducted on the load applied to the input pen 10 and the pen pressure detected by the coordinate input device 1. FIG. 7B shows the conditions for the tests shown in FIG. 7A.

The tests shown in FIG. 7A were conducted under the following conditions.

(1) The ferrite core 104 is made of L6, a material from TDK, and is 2.5 mm and 20 mm in outer diameter and length, respectively.

(2) The coil 105 consists of forty-six turns of a bundle of seven wires each having a diameter of 0.07 mm.

(3) The O-ring 103 is made of a silicone rubber material having a hardness of 30 degrees, and the outer diameter, inner diameter, and wire diameter thereof are 2 mm, 1 mm, and 0.5 mm, respectively.

(4) The ferrite chip 102 is made of L6 and is 2.5 mm and 1 mm in outer diameter and length, respectively.

In the tests (1) to (3) shown in FIGS. 7A, the projection 102a has the structures shown in FIG. 7B. The height of the projection 102a is shown by X in FIG. 7B, and the cross section thereof is circular. The following values of the projection 102a are given in a non-operation state of the input pen 10.

Condition 1 . . . 0.8 mm in outer diameter, 0.3 mm in height

Condition 2 . . . 0.8 mm in outer diameter, 0.1 mm in height

Condition 3 . . . no projection 102a

In the graph shown in FIG. 7A, the horizontal axis represents the load applied to the input pen 10, and the vertical axis represents the pen pressure level detected by the coordinate input device 1.

The pen pressure level detected by the tablet 20 varies with the inductance of the coil 105, as described above. Therefore, changes in the direction of the vertical axis of the graph indirectly represent changes in inductance of the coil 105.

Under the condition (3), that is in the case in which the projection 102a is not provided and the end face of the ferrite chip 102 is flat, the pen pressure level detected by the coordinate input device 1 gradually increases with the increase in load applied to the input pen 10, as shown in FIG. 7A.

Under the condition (2), that is in the case in which the projection 102a is 0.1 mm in height, the pen pressure level increases with the increase in load more sharply than under the condition (3), as shown by the curve in the graph.

Under the condition (1), that is in the case in which the projection 102a is 0.3 mm in height, the pen pressure level increases even more sharply with the increase in load, and the curve rises sharply.

After the load on the input pen 10 exceeds a predetermined value, the pen pressure level is maintained at a substantially constant value, as shown by the curves (1) and (2) in the graph. This state shows that the projection 102a and the ferrite core 104 are in contact due to elastic deformation of the O-ring 103.

As is evident from the results shown in FIG. 7A, the change in pen pressure level is more responsive to the change in load to the input pen 10 as the distance between the projection 102a and the end face of the ferrite core 104 in a non-operation state decreases. The presence or absence of the projection 102a has a great influence on the responsiveness of the pen pressure level detection. Even the projection 102a of only 0.1 mm in height brings about a result clearly different from that in the case in which the projection 102a is not provided. When the height of the projection 102a is 0.3 mm, the difference is more pronounced.

Accordingly, in the case in which the projection 102a is formed on the end face of the ferrite chip 102 and the ferrite chip 102 and the ferrite core 104 are close to each other in a non-operation state, even when a small load is applied to the input pen 10, the detected pen pressure level quickly responds thereto, and a pen pressure level higher than the predetermined level can be obtained. This allow the input pen 10 to be reliably operated even with a small force and to be used easily.

In this embodiment, the ferrite chip 102 and the ferrite core 104 are placed on the same axis by interposing the O-ring 103 therebetween, thereby reducing the diameter of the casing 11.

While the ferrite chip 102 and the ferrite core 104 are spaced by the O-ring 103 in this case, they can be placed closer to each other by forming the projection 102a on the ferrite chip 102 and fitting the projection 102a into the center of the O-ring 103.

Figure 8A:
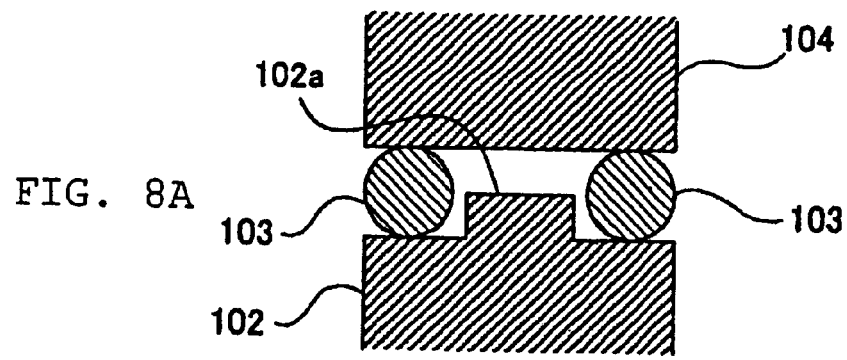
FIGS. 8A to 8C are cross-sectional views showing examples of structures of a ferrite chip and a ferrite core in the input pen shown in FIG. 1.
Figure 8B:
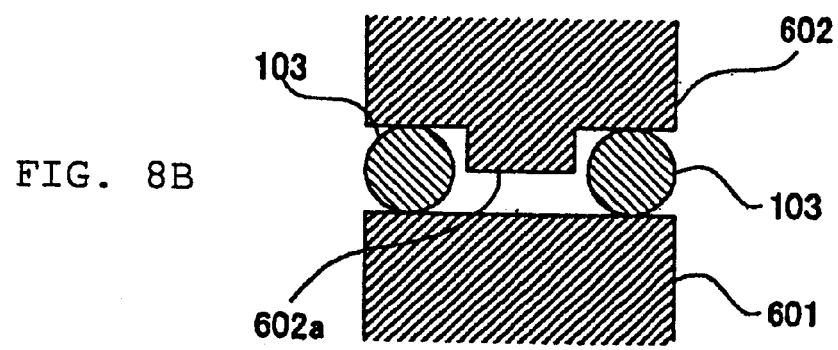
Figure 8C:
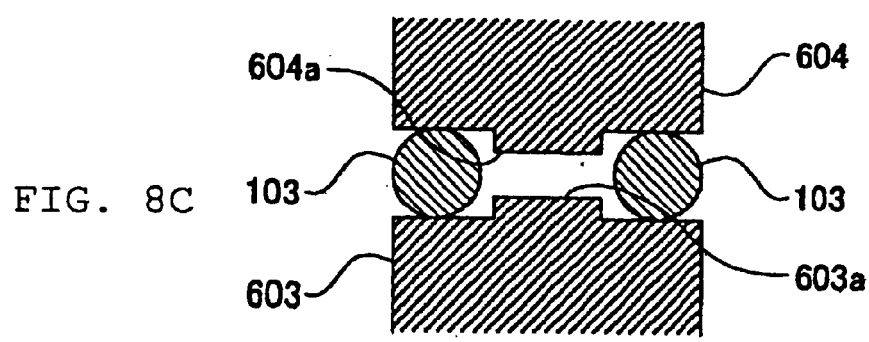

FIGS. 8A to 8C show examples of structures of the ferrite chip 102 and the ferrite core 104 in the input pen 10. FIG. 8A is a cross-sectional view showing the structure shown in FIG. 1, FIG. 8B is a cross-sectional view showing another structure, and FIG. 8C is a cross-sectional view showing a further structure.

As shown in FIG. 8A, the ferrite core 104 having a substantially flat end face and the ferrite chip 102 having the projection 102a are opposed to each other in the input pen 10 shown in FIG. 1.

Such a condition in which the ferrite chip 102 and the ferrite core 104 are placed close to each other via the O-ring 103 may also be satisfied by other structures.

For example, as shown in FIG. 8B, the ferrite chip 102 may be replaced with a ferrite chip 601 having a substantially flat end face, and the ferrite core 104 may be replaced with a ferrite core 602 having a projection 602a. The projection 602a is formed in the center of the end face, in a manner similar to that of the projection 102a and is fitted into a through hole of the O-ring 103.

In this case, since the substantially flat end face of the ferrite chip 601 and the projection 602a of the ferrite core 602 are opposed to each other via the O-ring 103, advantages similar to those in the structure shown in FIG. 8A can be obtained. It is noted that the height of the projection 602a is set so that the projection 602a does not contact the opposing end face in a non-operation state of the input pen 10.

For example, as shown in FIG. 8C, the ferrite chip 102 may be replaced with a ferrite chip 603 having a projection 603a, and the ferrite core 104 may be replaced with a ferrite core 604 having a projection 604a. The projections 603a and 604a are formed in the centers of the end faces, in a manner similar to that of the projection 102a, and are fitted into the through hole of the O-ring 103. Since the projection 603a of the ferrite chip 603 and the projection 604a of the ferrite core 604 are opposed to each other via the O-ring 103 in this case, advantages similar to those in the structure shown in FIG. 8A can be obtained. It is noted that the heights of the projections 603a and 604a are set so that the projections 603a and 604a do not contact each other in a non-operation state of the input pen 10.

While the rodlike projections are formed at almost the centers of the end faces in the structures shown in FIGS. 8B and 8C, the present invention is not limited to these structures.

Figure 9A:
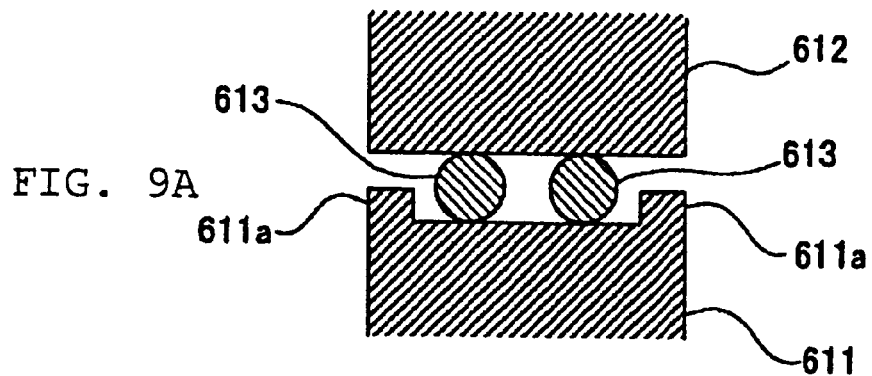
FIGS. 9A to 9C are cross-sectional views showing further examples of structures of the ferrite chip and the ferrite core shown in FIG. 1.
Figure 9B:
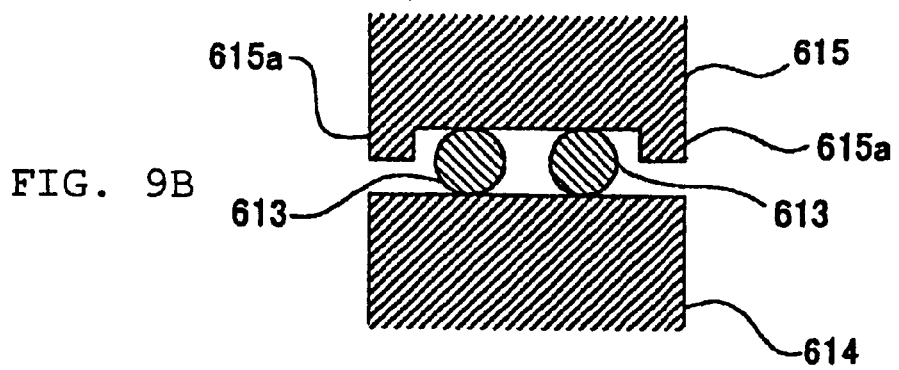
Figure 9C:
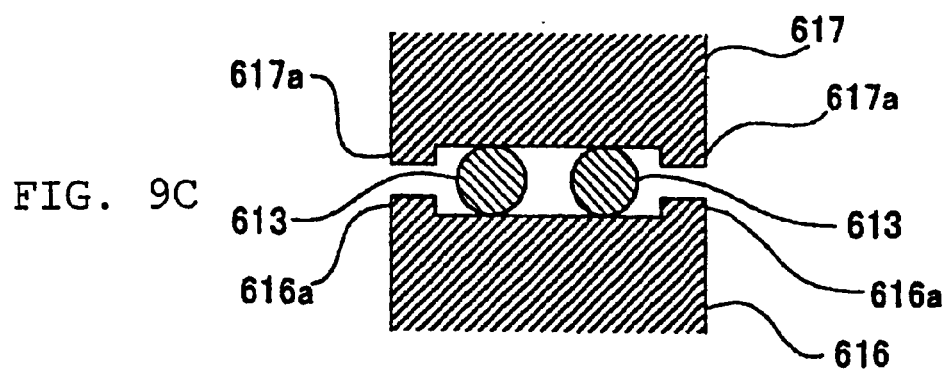

FIGS. 9A to 9C show alternatives to the ferrite chip 102 and the ferrite core 104. FIG. 9A is a cross-sectional view of a ferrite chip 611 and a ferrite core 612, FIG. 9B is a cross-sectional view of a ferrite chip 614 and a ferrite core 615, and FIG. 9C is a cross-sectional view of a ferrite chip 616 and a ferrite core 617.

As shown in FIG. 9A, the ferrite chip 102 may be replaced with a ferrite chip 611 having a peripheral projection 611a formed on the outer rim of the end face, the O-ring 103 may be replaced with an O-ring 613 having an outer diameter smaller than that of the O-ring 103 and capable of being held in the peripheral projection 611a, and the ferrite core 104 may be replaced with a ferrite core 612 having a substantially flat end face.

Figure 10A:
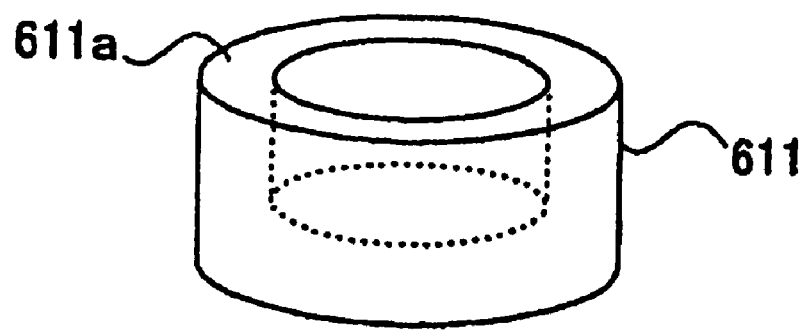
FIGS. 10A and 10B show other examples of structures of the ferrite chip shown in FIG. 1.

The ferrite chip 611 is a substantially cylindrical member, as shown in FIG. 10A. Only the upper peripheral portion thereof projects to form the peripheral projection 611a, and the inner portion of the peripheral projection 611a is concave. The O-ring 613 is held inside the peripheral projection 611a. By adjusting the thickness of the O-ring 613 and the height of the peripheral projection 611a so that the peripheral projection 611a does not contact the end face of the ferrite core 612 in a non-operation state of the input pen 10, as shown in FIG. 9A, advantages similar to those in the input pen 10 shown in FIG. 1 can be obtained.

As shown in FIG. 9B, the ferrite core 104 may be replaced with a ferrite core 615 having a peripheral projection 615a similar to the peripheral projection 611a, and the ferrite chip 102 may be replaced with a ferrite chip 614 having a substantially flat end face. By placing the peripheral projection 615a so as not to contact the end face of the ferrite chip 614 in a non-operation state of the input pen 10, as shown in FIG. 9B, advantages similar to those in the input pen 10 shown in FIG. 1 can be obtained.

As shown in FIG. 9C, the ferrite chip 102 may be replaced with a ferrite chip 616 having a peripheral projection 616a similar to the peripheral projection 611a, and the ferrite core 104 may be replaced with a ferrite core 617 having a peripheral projection 617a similar to the peripheral projection 611a. In this case, advantages similar to that in the input pen 10 shown in FIG. 1 can be obtained by placing the peripheral projection 616a so as not to contact with the peripheral projection 617a in a non-operation state of the input pen 10.

Figure 10B:
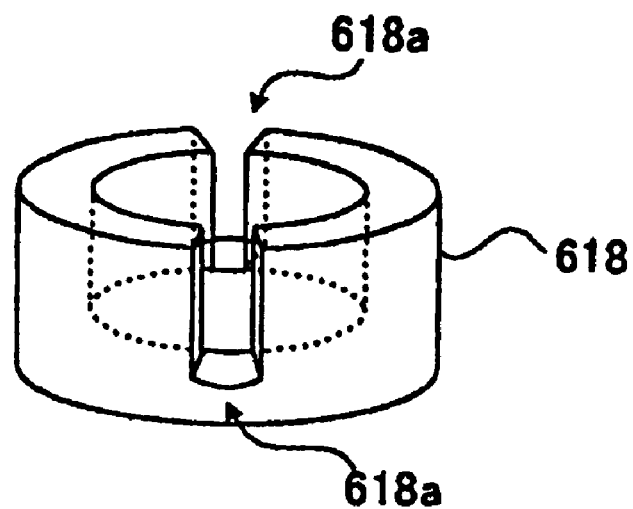

The shape of the peripheral projections 611a, 615a, 616a, and 617a are not limited to the shape shown in FIG. 10A, and the peripheral projections 611a, 615a, 616, and 617a may have cutout portions 618a as in a ferrite chip 618 shown in FIG. 10B. In this case, the number and shape of the cutout portions 618a may be determined arbitrarily.

Furthermore, the O-ring 613 may be replaced with a flexible ball by holding the ferrite chip 611 and the ferrite core 612 shown in, for example, FIG. 9A on the same axis so as not to be displaced in the lateral direction.

That is, it is satisfactory as long as the O-ring 103 shown in FIG. 1 and the O-ring 613 shown in FIG. 9A can hold the ferrite chip and the ferrite core with a space therebetween in a non-operation state of the input pen 10, and can elastically deform during operation of the input pen 10. Therefore, the O-ring 613 may be replaced with a plurality of balls.

Figure 11A:
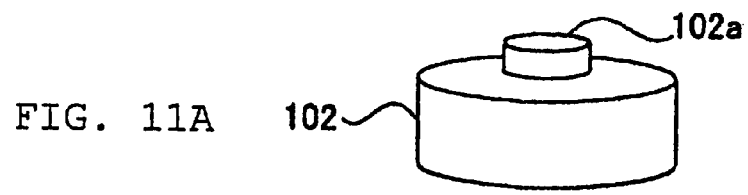
FIGS. 11A to 11G show examples of structures of a projection of the ferrite chip and an O-ring in the input pen shown in FIG. 1.
Figure 11B:
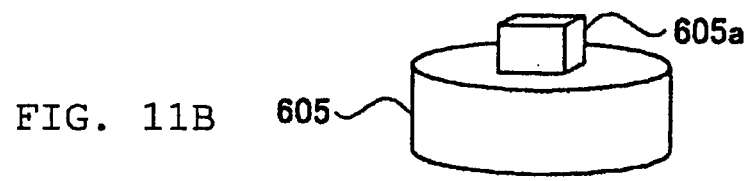
Figure 11C:
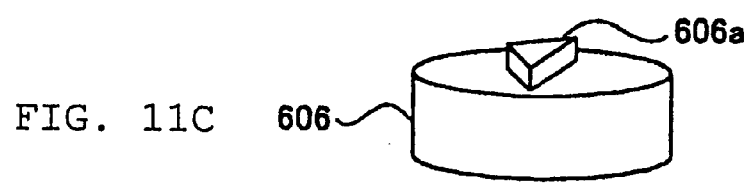
Figure 11D:
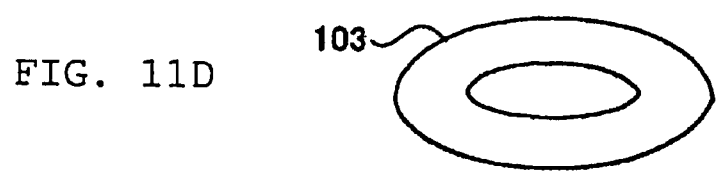
Figure 11E:
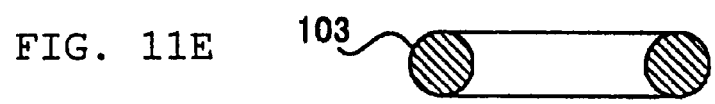
Figure 11F:
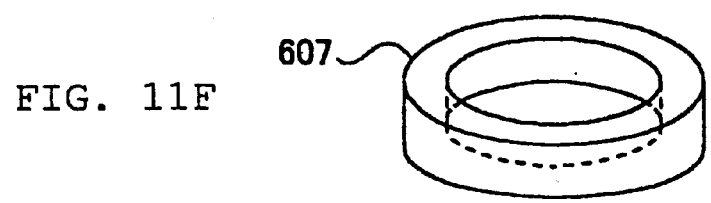
Figure 11G:

FIGS. 11A to 11G show examples of structures of the projection 102a of the ferrite chip 102 and the O-ring 103. FIG. 11A is a perspective view showing the structure of the projection 102a, FIG. 11B is a perspective view showing another structure different from that in FIG. 11A, and FIG. 11C is a perspective view showing a further structure different from those in FIGS. 11A and 11B. FIG. 11D is a perspective view showing the structure of the O-ring 103 shown in FIG. 1, FIG. 11E is a perspective view of the O-ring 103, FIG. 11F is a perspective view of another structure of the O-ring, and FIG. 11G is a cross-sectional view of the O-ring.

While the projection 102a of the ferrite chip 102 in the input pen 10 is shaped as a rod of circular cross section in the above embodiment, as shown in FIG. 11A, it may be replaced with, for example, a projection 605a of rectangular cross section, as shown in FIG. 11B.

In the case in which a ferrite chip 605 having such a projection 605a is adopted instead of the ferrite chip 102 in the input pen 10, advantages similar to those of the above embodiment can be obtained by fitting the projection 605a into the through hole of the O-ring 103.

Furthermore, the ferrite chip 102 may be replaced with a ferrite chip 606 having a projection 606a of triangular cross section, as shown in FIG. 11C. In this case, advantages similar to those in the above embodiment can be obtained by fitting the projection 606a in the through hole of the O-ring 103. Other projections having shapes different from those of the projections 605a and 606a may, of course, be used.

As shown in FIGS. 11D and 11E, the O-ring 103 in the input pen 10 is of circular cross section and is shaped like the letter O. The O-ring 103 has a circular cross section and is in linear contact with the end faces of the ferrite chip 102 and the ferrite core 104. For this reason, during operation of the input pen 10, the O-ring 103 can be elastically deformed between the ferrite chip 102 and the ferrite core 104, so as to horizontally stretch along the end face of the ferrite core 104. That is, since the contact portions of the O-ring 103 with the ferrite chip 102 and the ferrite core 104 are changed from the linear state to the planar state, the O-ring 103 is elastically deformed with ease during operation of the input pen 10. Accordingly, when the input pen 10 is operated, the O-ring 103 is quickly deformed, and the ferrite chip 102 and the ferrite core 104 are moved closer together. This allows the O-ring 103 shown in FIGS. 11D and 11E to be suitably used in the input pen 10.

In contrast, the O-ring 103 may be replaced with an O-ring 607 of rectangular cross section and shaped like the letter O, as shown in FIGS. 11F and 11G. In that case, since the O-ring 607 is in planar contact with the ferrite chip 102 and the ferrite core 104, it is relatively difficult to elastically deform. However, by making the O-ring 607 of a more flexible material, operability similar to that of the O-ring 103 can be obtained. In the case in which the input pen 10 is structured to be suitably operated by a relatively strong force, the O-ring 607, which is more difficult to elastically deform than the O-ring 103, is preferred.

As described above, since the ferrite core 104 does not have an opening and a cavity in the input pen 10, even when it is made smaller, the problem of insufficient strength will not arise. The lead 101 and the ferrite chip 102 can also be easily reduced and housed in the considerably thin casing 11, which reduces the size of the input pen 10. Since the inductance of the coil 105 increases when the input pen 10 is operated, the input pen 10 can be operated in a manner similar to that of the coordinate pointing device using an expensive variable capacitor.

That is, a coordinate pointing device used in combination with a position detecting device sometimes adopts, in order to detect operation, an LC resonance circuit using a variable capacitor whose capacity varies with pressure. When such a coordinate pointing device is operated by the operator, the capacity of the variable capacitor increases, and as a result, the resonance frequency of the LC resonance circuit shifts to a lower value. For this reason, the coordinate pointing device is highly sensitive, while it is complicated in structure and is expensive. In contrast, when the input pen 10 of the present invention is operated, the inductance of the coil 105 increases, and therefore, the resonance frequency of the tuning circuit 15 shifts to a lower value. This makes it possible to provide an inexpensive pen-shaped coordinate pointing device with a simple structure which operates in a manner similar to that of the coordinate pointing device using the variable capacitor.

Since the O-ring 103 is interposed between the ferrite chip 102 and the ferrite core 104, the return motion is smoothly made after operation is completed by removing the input pen 10 from tablet 20, and high operability is obtained. Furthermore, the force applied during operation can be detected by finding the amount of deformation of the O-ring 103 based on the amount of change in inductance of the coil 105.

Since the O-ring 103 is shaped so as not to cover the entire end faces of the ferrite chip 102 and the ferrite core 104, a portion of the ferrite chip 102 and the ferrite core 104 are directly opposed. Consequently, the inductance of the coil 105 changes during operation, and the operation is detected reliably and with sensitivity. This improves responsiveness of the input pen 10 and ensures high operability.

Since the ferrite chip 102 has the projection 102a, it is possible to reduce the space between the ferrite chip 102 and the ferrite core 104 in an initial state and to thereby quickly move the ferrite chip 102 and the ferrite core 104 closer together during operation. Furthermore, since the height of the projection 102a is less than the thickness of the O-ring 103, the ferrite chip 102 and the ferrite core 104 can be spaced in a non-operation state by placing the O-ring 103 therebetween. This allows a simpler structure.

Since the O-ring 103 is used as the elastic member placed between the ferrite chip 102 and the ferrite core 104, the ferrite chip 102 and the ferrite core 104 can be easily moved closer to each other even by applying a relatively small force. For this reason, the input pen 10 is operated with small resistance by a relatively small force.

While the ferrite chip 102 and the ferrite core 104 are cylindrical in the above embodiment, the present invention is not limited to the embodiment. It is satisfactory as long as the ferrite core 104 has such a shape as to wind the coil 105 thereon and as long as the ferrite chip 102 has such a shape as to be fixed to the lead 101. The O-ring 103 may be replaced with, for example, a plurality of flexible members shaped like a rectangular parallelepiped or the like and stuck on the ferrite chip 102.

The shape of the casing 11 is not limited to the shape like a writing instrument and may be arbitrarily determined as long as the casing 11 can hold therein the ferrite chip 102, the O-ring 103, the ferrite core 104, the substrate holder 12, the substrate 13, the capacitor 14, the tuning circuit 15, and the like. It is noted that other structures may be variously changed within the technical field specified in the claims.

While the ferrite chip 102, the O-ring 103, and the ferrite core 104 are disposed at the leading end of the casing 11 in the above embodiment, they may be disposed at the tail end of the casing 11. This structure will be described below as a modification of the above embodiment with reference to FIG. 12.

Figure 12:
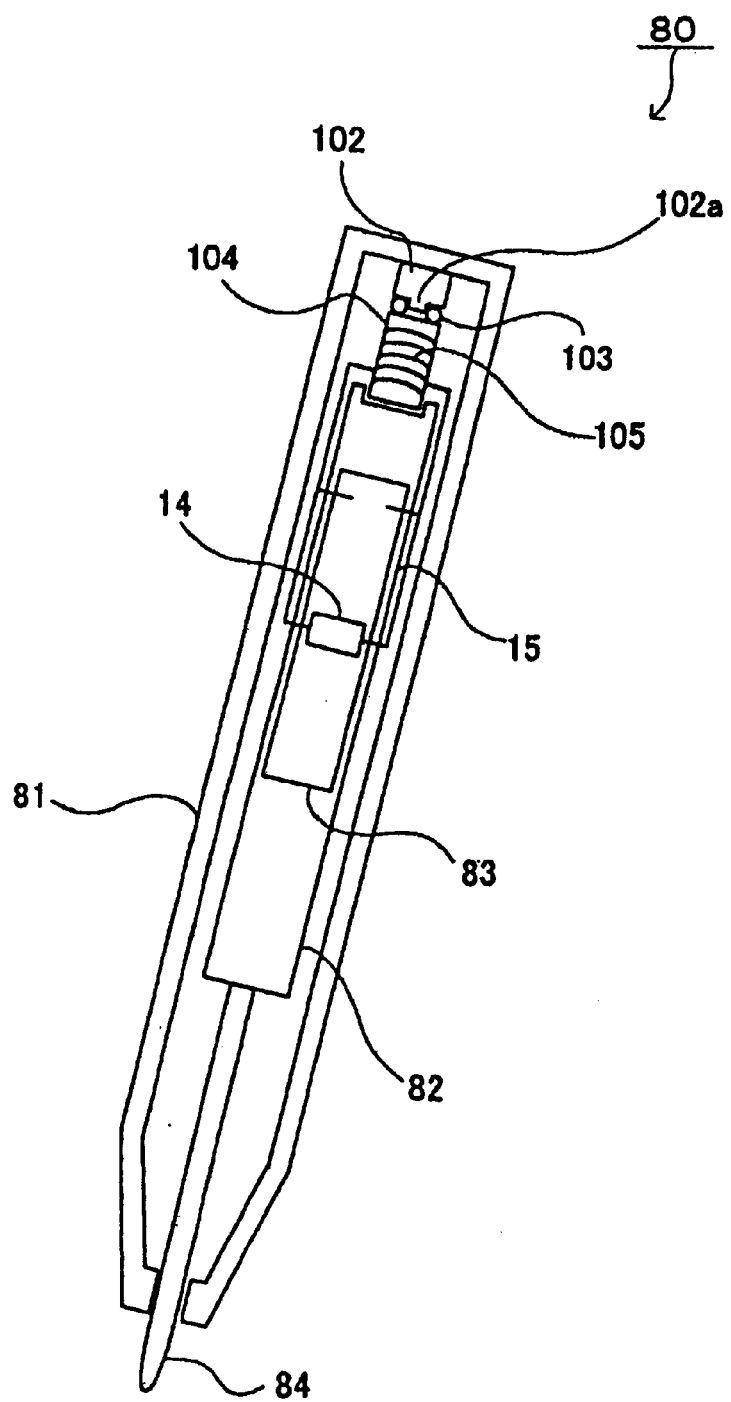
FIG. 12 is a cross-sectional view showing the structure of an input pen according to a second embodiment of the present invention.
Figure 13:
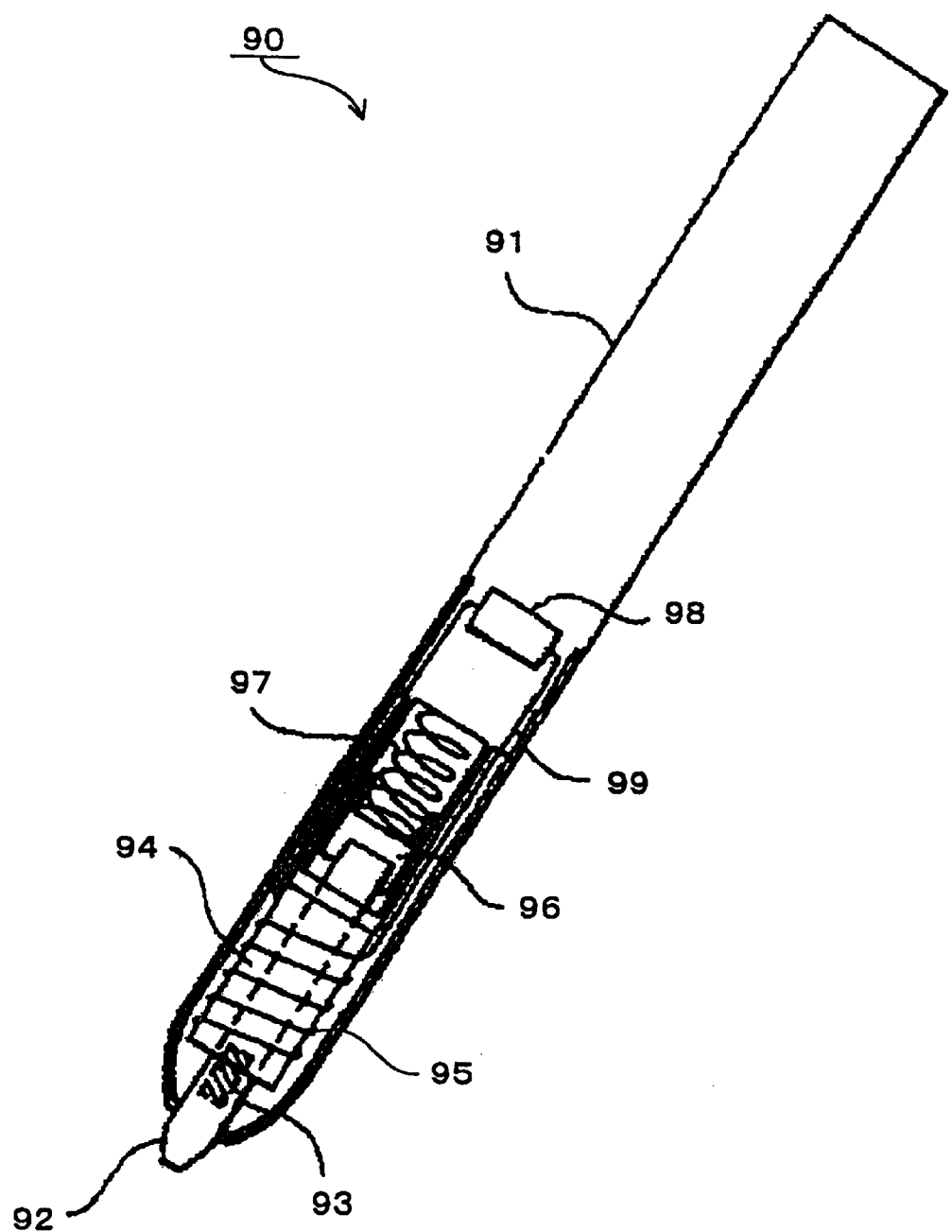
FIG. 13 is a cross-sectional view showing the structure of an input pen used in a conventional pen and tablet.

FIG. 12 is a cross-sectional view showing the structure of an input pen 80 in this modification.

Referring to FIG. 12, the input pen 80 comprises a casing 81, a substrate holder 82, a substrate 83, and a lead 84. The same components as those in the input pen 10 shown in FIG. 1 are denoted by the same numerals, and descriptions thereof are omitted.

In the input pen 80 shown in FIG. 12, the components are housed in the small casing 81 made of synthetic resin or metal and shaped like a typical writing instrument, such as a ballpoint pen or a mechanical pencil, in a manner similar to that of the casing 11.

At the leading end of the casing 81, the rodlike lead 84 is placed so as to be movably insertable into the casing 81. The base end of the lead 84 is fixed to one end of the substrate holder 82.

The substrate 83 is fixed to the substrate holder 82 and has various elements, including a capacitor 14, mounted thereon. These elements and the capacitor 14 mounted on the substrate 83 and a coil 105 constitute a tuning circuit 15.

A ferrite core 104 is fixed to the other end of the substrate holder 82 and is opposed to a ferrite chip 102 via an O-ring 103. The ferrite chip 102 is fixed to the inner surface at the base end of the casing 81.

In a manner similar to that of the input pen 10, the input pen 80 is held on a substantially flat tablet 20 (FIG. 2) so that the leading end of the casing 11 points downwardly, like a typical writing instrument, and is operated so that the lead 84 is pressed against the tablet 20.

When the input pen 80 is operated, the lead 84 is pushed into the casing 81. Since the substrate holder 82 is thereby pressed together with the lead 84, the ferrite core 104 fixed to the substrate holder 82 is pressed toward the base end of the casing 81, that is, toward the ferrite chip 102. The O-ring 103 is elastically deformed by the pressing force applied thereto via the ferrite core 104, so as to move the ferrite core 104 and a projection 102a formed in the ferrite chip 102 closer together.

Therefore, when the input pen 80 is operated, the projection 102a and the ferrite core 104 are moved closer together, and the inductance of the coil 105 changes, in a manner similar to that of the input pen 10. Accordingly, when the input pen 80 is operated on the tablet 20 instead of the input pen 10, the coordinate position indicated by the input pen 80 can be detected.

The input pen 10 of the above embodiment has the advantage of being able to reliably respond to the operation, for example, even when the casing 11 is tilted, because the ferrite chip 102 is disposed on the side of the lead 101. Except for this respect, however, the input pen 80 shown in FIG. 12, in which the ferrite chip 102 is disposed at the base end of the casing 81, can also provide similar advantages.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A pen-shaped coordinate pointing device for indicating a position to be measured and an operation by an operator to a position detecting device for measuring the position, said pen-shaped coordinate pointing device comprising:

a coil wound on a core having an end face with no opening; and a magnetic member placed along the axis of said coil so as to be opposed to said end face of said core, wherein said core and said magnetic member are spaced from each other when in a non-operation state; and wherein said space between said core and said magnetic member varies in response to an application of pressure to the device by the operator and said core and said magnetic member are moved closer together such that said coil generates an inductance signal indicative of the pressure applied, said inductance signal varying with a change in pressure exerted by the operator.

2. A pen-shaped coordinate pointing device according to claim 1, further comprising:

an elastic member interposed between said end face of said core and said magnetic member.

3. A pen-shaped coordinate pointing device according to claim 2, wherein said elastic member is in contact with only a part of said end face of said core and is in contact with only a part of a face of said magnetic member opposing said end face of said core, and a part of said end face of said core and a part of said opposing face of said magnetic member are opposed to each other without said elastic member therebetween.

4. A pen-shaped coordinate pointing device according to claim 1, wherein at least one of said end face of said core and said face of said magnetic member opposing said end face of said core has a projection having a height less than the thickness of said elastic member.

5. A pen-shaped coordinate pointing device according to claim 4, wherein said elastic member is an annular member having a through hole connected to said end face of said core and said opposing face of said magnetic member, and said projection projects in said through hole of said elastic member.

6. A pen-shaped coordinate pointing device according to claim 5, wherein said elastic member is an annular member in linear contact with said end face of said core and said opposing face of said magnetic member, said projection has a side face formed along the inner side face of said elastic member, and both said magnetic member and said core are cylindrical.

7. A pen-shaped coordinate pointing device according to claim 1, wherein said core and said magnetic member are held in a pen-shaped casing, a lead is disposed at the leading end of said casing so as to be movably inserted in said casing, and said magnetic member is connected to the base end of said lead.

* * * * *